United States Patent
Kyoya et al.

(10) Patent No.: US 6,664,998 B1
(45) Date of Patent: Dec. 16, 2003

(54) COMPOUND OPTICAL DEVICE, COMPOUND OPTICAL UNIT INCLUDING THE COMPOUND OPTICAL DEVICE, AND OPTICAL PICKUP APPARATUS INCLUDING THE COMPOUND OPTICAL UNIT

(75) Inventors: Shoichi Kyoya, Miyagi-ken (JP); Tatsumaro Yamashita, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/676,193

(22) Filed: Sep. 28, 2000

(30) Foreign Application Priority Data

Oct. 1, 1999 (JP) .......................................... 11-282154
Jan. 7, 2000 (JP) ........................................ 2000-005874

(51) Int. Cl.[7] ........................... B41J 15/14; G11B 7/135
(52) U.S. Cl. ................................. 347/241; 369/112.05
(58) Field of Search .................................. 347/241, 256; 369/44.12, 44.14, 112.04, 112.05, 112.07, 103, 112.14, 112; 250/216; 359/711

(56) References Cited

U.S. PATENT DOCUMENTS

| | | | | |
|---|---|---|---|---|
| 4,792,674 A | | 12/1988 | Hirano | 250/216 |
| 4,924,082 A | * | 5/1990 | Opheij et al. | 250/216 |
| 4,945,527 A | * | 7/1990 | Sunagawa | 369/44.12 |
| 5,608,708 A | * | 3/1997 | Ophey | 369/112.14 |
| 6,023,448 A | * | 2/2000 | Tajiri et al. | 369/112.04 |
| 6,108,138 A | * | 8/2000 | Ophey et al. | 359/711 |
| 6,185,176 B1 | * | 2/2001 | Sugiura et al. | 369/103 |
| 6,256,283 B1 | * | 7/2001 | Fukakusa et al. | 369/112 |

* cited by examiner

Primary Examiner—Hai Pham
(74) Attorney, Agent, or Firm—Brinks Hofer Gilson & Lione

(57) ABSTRACT

A compound optical unit includes a housing mounted on an optical pickup apparatus, the housing has a semiconductor laser device, a light receiving device, and a compound optical device, fixed to the housing. The semiconductor laser device includes a laser diode for emitting shorter wavelength laser beams for a DVD and another laser diode for emitting longer wavelength laser beams for a CD. The compound optical device includes an incidence surface and an emission surface for receiving and emitting, respectively, the light beams emitted by the semiconductor laser device, a diffraction lattice provided on the emission surface for diffracting light beams reflected and returned from an optical disk, and a reflective surface for reflecting the light beams diffracted by the diffraction lattice toward the light receiving device. The reflective surface is provided with a correction element for focusing the light beams of different wavelengths on one light receiving position of the light receiving device.

25 Claims, 13 Drawing Sheets

COMPOUND OPTICAL DEVICE, COMPOUND OPTICAL UNIT INCLUDING THE COMPOUND OPTICAL DEVICE, AND OPTICAL PICKUP APPARATUS INCLUDING THE COMPOUND OPTICAL UNIT

BACKGROUND OF THE INVENTION

1. Field of the Invention

The present invention relates to a compound optical unit which is a light generating and receiving unit to be preferably used in an optical apparatus such as an optical pickup for applying light beams to an optical disk and receiving the light beams returned from the optical disk for reading from and writing on the optical disk.

2. Description of the Related Art

A compound optical unit is known which is a light generating and receiving unit for applying light beams to an optical disk and receiving the light beams from the optical disk for reading from and writing on the optical disk.

The optical unit is mounted in an optical pickup apparatus which is used for writing data on optical disks, such as a CD (compact disk), a CD-R (compact disk, recordable), and a DVD ("digital versatile disk" or "digital video disk"), and for reading data recorded on the optical disks.

Recently, a DVD device has been introduced on the market, the DVD device being for reading from and writing on DVDs which are optical disks having data densities higher than those of CDs. The DVD device is required to be compatible with a CD (including CD-R) device. Therefore, the DVD device must be provided with laser light sources having two different wavelengths, that is, a shorter, wavelength laser light source (650 nm band) for a DVD and a longer wavelength laser light source (780 nm band) for the reading from and writing on a CD-R which cannot be read by the laser source of the 650 nm band.

FIG. 18 is a plan view of an optical pickup apparatus 20 provided with known optical units 4 and 8. The optical pickup apparatus 20 includes the optical unit 4 for a DVD 17 which is a high density optical disk, the optical unit 8 for a CD 18 which is a low density optical disk, a beam splitter 10 for guiding the laser beams, which are emitted by the optical units 4 and 8 and have different wavelengths from each other, along the same optical axis, a wavelength filter 15 serving as an aperture diaphragm for controlling the diameters of light fluxes of the laser beams in accordance with the wavelength of the laser beams, an objective lens 16, and a carriage 20 for disposing the components at predetermined positions, thereby reading from the DVD 17 and the CD 18.

Each component is described in detail as follows.

The optical unit 4 includes a light source 2 for generating laser beams for a DVD (wavelength in the 650 nm band), a light receiving device 3 for receiving the laser beams reflected from the DVD 17, a substrate 4a provided with the light source 2 and the light receiving device 3, a side wall 4b fixed to the substrate 4a so as to cover the light source 2 and the light receiving device 3, an emission part 4d which is an opening formed in the side wall 4b, and an optical device 5 of a light transmitting material such as glass affixed so as to cover the emission part 4d. The light source 2 is fixed to the substrate 4a so as to oppose the optical device 5. The light receiving device 3 is formed adjacent to the light source 2 on the substrate 4a. By a diffraction lattice 5a formed on the optical device 5, the laser beams emitted by the light source 2 and reflected from the DVD 17 (returning light) are led to a predetermined position on the light receiving device 3. The optical device 5 is positioned by a given reference optical system so that the beams diffracted by the diffraction lattice 5a are led to the predetermined position on the light receiving device 3, then the optical device 5 is fixed to the emission part 4d.

The optical unit 8 includes a light source 6 for generating laser beams for a CD (wavelength in the 780 nm band), a light receiving device 7 for receiving the laser beams reflected from the CD 18, a substrate 8a provided with the light source 6 and the light receiving device 7, a side wall 8b fixed to the substrate 8a so as to cover the light source 6 and the light receiving device 7, an emission part 8d which is an opening formed in the side wall 8b, and an optical device 9 of a light transmitting material such as glass affixed so as to cover the emission part 8d. The light source 6 is fixed to the substrate 8a so as to oppose the optical device 9. The light receiving device 7 is formed adjacent to the light source 6 on the substrate 8a. By a diffraction lattice 9a formed on the optical device 9, the laser beams emitted by the light source 6 and reflected from the CD 18 (returning light) are led to a predetermined position on the light receiving device 7. The optical device 9 is provided with a beam forming part 9b, which is a diffraction lattice, for tracking control by a three-beam method. The optical device 9 is positioned by a given reference optical system so that the beams diffracted by the diffraction lattice 9a are led to the predetermined position on the light receiving device 7, then the optical device 9 is fixed to the emission part 8d.

The beam splitter 10 guides the laser beams from the light source 2 and the light source 6 onto the optical disks 17 and 18. The beam splitter 10 includes two triangular prisms connected to each other so as to form a rectangular parallelepiped. An optical film (dichroic film) having wavelength-selection function is coated at the interface of the two prisms. The dichroic film transmits laser beams for a CD and reflects those for a DVD, and the efficiency in use of the laser beams from the light sources 2 and 6 can be effectively designed.

The wavelength filter 15 transmits the laser beams emitted by the light source 2, and reflects or absorbs the laser beams emitted by the light source 6. The wavelength filter 15 controls the diameters of light fluxes of the laser beams emitted by the light sources 2 and 6. With this arrangement, aberration is made minimized when the laser beams emitted by the light sources 2 and 6 are condensed by the objective lens 16 and a spot of the condensed laser beams is applied to the DVD 17 or the CD 18.

The optical units 4 and 8 are disposed and operates when reading from optical disks which are the DVD 17 and the CD 18, as described below.

The optical units 4 and 8 are disposed substantially at an angle of 90 degrees with respect to each other with the beam splitter 10 therebetween. The optical unit 8 is disposed substantially in parallel to an optical axis between the wavelength filter 15 and the objective lens 16, and the optical unit 4 is disposed substantially perpendicular to the optical axis between the wavelength filter 15 and the objective lens 16.

When reading from the DVD 17, the laser beams having wavelengths of 635 to 650 nm and emitted by the light source 2 are applied to the beam splitter 10 through the emission part 4d and the diffraction lattice 5a of the optical unit 4. The laser beams applied to the beam splitter 10 are reflected and emitted thereby substantially at an angle of 90 degrees with respect to the incident optical axis of the laser beams, and are applied to the wavelength filter 15 disposed adjacent to the beam splitter 10. The light flux of the laser beams from the light source 2 for DVDs is transmitted by the wavelength filter 15 without being significantly restricted. The laser beams transmitted by the wavelength filter 15 are applied to the objective lens 16 and are focused on the data recording surface of the DVD 17 by a condensing effect of the objective lens 16.

The laser beams reflected from the DVD 17 are transmitted by the objective lens 16 and the wavelength filter 15, are reflected by the beam splitter 10, the optical axis thereof being bent toward the optical unit 4, and are applied to the diffraction lattice 5a. The laser beams are diffracted by the diffraction lattice 5a and are applied to a light receiving element of the light receiving device 3. The laser beams applied to the light receiving device 3 are photoelectrically converted so as to form a read signal which is a voltage signal converted from an electric current outputted in response to a signal from the data recording surface of the DVD 17, the read signal being outputted through external terminals 4c of the optical unit 4. A part of the laser beams incident on the light receiving device 3 is used for focusing and tracking control.

When reading from the CD 18, laser beams having wavelengths of 770 to 790 nm and emitted by the light source 6 are transmitted by the emission part 8d of the optical unit 8, the beam forming part 9b, and the diffraction lattice 9a. The laser formed in beams by the beam forming part 9b is applied to the beam splitter 10. The laser beams applied to the beam splitter 10 are transmitted and emitted by the beam splitter 10, and are applied to the wavelength filter 15 disposed adjacent to the beam splitter 10. The laser beams from the light source 6 for CDs are reflected by an annular band formed at the periphery of the wavelength filter 15 and are transmitted by the wavelength filter 15 at a portion in which the annular band is not formed. The laser beams transmitted by the wavelength filter 15 are applied to the objective lens 16, and are focused on the data recording surface of the CD 18 by a condensing effect of the objective lens 16.

The laser beams reflected from the CD 18 and transmitted by the objective lens 16 and the wavelength filter 15 are transmitted by the beam splitter 10, and are applied to the diffraction lattice 9a. The laser beams are diffracted by the diffraction lattice 9a and are applied to a light receiving element of the light receiving device 7 without passing through the beam forming part 9b. The laser beams applied to the light receiving device 7 are photoelectrically converted so as to form a read signal which is a voltage signal converted from an electric current outputted in response to a signal from the data recording surface of the CD 18, the read signal being outputted from external terminals 8c of the optical unit 8. A part of the laser beams incident on the light receiving device 7 is used for tracking control by a three-beam method and for focusing control.

When a known optical unit is mounted on an optical apparatus such as an optical pickup using light sources for generating light beams having, for example, two different wavelengths, the two optical units 4 and 8 corresponding to the two wavelengths must be used. Moreover, the beam splitter 10 is required for leading the laser beams emitted by the light sources 2 and 6 of the optical units 4 and 8, respectively, along the same optical axis, whereby the number of components of the optical pickup apparatus is increased, thereby making the structure thereof complex.

In order to solve the above-described problem, the known optical unit 4 may be provided additionally with the light source 6 so as to have two light sources so that the optical unit 4 generates light beams having two wavelengths. However, in this case, the laser beams for a CD are diffracted at an angle greater than that of the laser beams for a DVD because laser beams having a longer wavelength are diffracted by the diffraction lattice 5a of the optical device 5 at a greater diffraction angle. Therefore, the light receiving device 3, which is positioned so as to receive diffracted laser beams from a DVD, cannot receive diffracted laser beams from a CD. For this reason, an optical unit for generating laser beams having two different wavelengths is not possible by additionally providing only the light source 6.

In order to solve the problems described above, a light receiving device for receiving diffracted laser beams from a CD may be formed independently from the light receiving device for a DVD in the optical unit 4. However, it is very difficult to adjust the position of the optical device 5 so as to apply diffracted light beams to each light receiving position of the light receiving devices for a CD and DVD because variations may occur in the distance between the light receiving devices for a CD and DVD.

Even when each light receiving device is formed so that the variations in the distance between the light receiving devices are minimal and the mounting position of the optical element 5 is accurately adjusted, thereby forming an optical unit for generating laser beams having two wavelengths, the additional light receiving device makes the structure complex and increases material costs. Moreover, the manufacturing cost is increased due to processes for accurately forming the light receiving devices and processes of accurately positioning the optical element 5, thereby increasing costs of the optical unit. Therefore, the above-described method is not practical.

SUMMARY OF THE INVENTION

Accordingly, it is an object of the present invention to provide a compound optical unit, which can be used in an optical apparatus such as an optical pickup provided with a plurality of light sources for generating light beams of different wavelengths, being provided with one light receiving element, for which costs can be reduced by preventing the structure thereof from being complex.

To these ends, according to a first aspect of the present invention, the compound optical unit comprises a housing mounted on an optical apparatus. A light generating device is fixed to the housing and includes a plurality of light generating elements to emit light beams of different wavelengths. A light receiving device and a compound optical device are also fixed to the housing. The compound optical device includes an incidence surface and an emission surface to receive and emit, respectively, the light beams emitted by the light generating device. A diffraction element on the emission surface diffracts light beams returning from the optical apparatus and a reflective surface reflects the light beams diffracted by the diffraction element toward the light receiving device. The reflective surface includes a correction element that focuses the light beams of different wavelengths on one position of the light receiving device.

In the compound optical unit according to the present invention, the light generating device may include a first package containing the plurality of light generating elements, and external terminals provided on the first package. The light receiving device may include a light receiving element, a second package for containing the light receiving element, and external terminals provided on the second package.

In the compound optical unit according to the present invention, the correction element may comprise a diffraction lattice.

The diffraction lattice may comprise a rugged part formed integrally with the reflective surface.

In the compound optical unit according to the present invention, the incidence surface and the emission surface may be disposed substantially in parallel to each other. The light generating device may be disposed in the housing such that the optical axis of the light beams emitted by the light generating device is substantially perpendicular to the emission surface. The reflective surface may be inclined with respect to the emission surface. The light receiving device may be disposed substantially at an angle of 90 degrees with respect to the light generating device.

In the compound optical unit according to the present invention, the compound optical device provided with the diffraction element and the correction element may comprise a resin, the diffraction element and the correction element being formed by molding integrally with the compound optical device.

The optical apparatus provided with an objective lens may comprise an optical pickup to read from and write on an optical disk. The light beams emitted by the light generating device may be applied to the optical disk through the objective lens, and the light beams returned from the optical disk may be received by the light receiving device.

According to a second aspect of the present invention, a compound optical device comprises an incidence surface to which laser beams of different wavelengths are applied, the laser beams having the optical axes parallel to each other; an emission surface from which the laser beams applied to the incidence surface are emitted; a returning light incoming surface to which returning light beams of the laser beams emitted by the emission surface are applied; a returning light emitting surface to emit the returning light beams applied to the returning light incoming surface; and a returning light reflecting surface to reflect the returning light beams applied to the returning light incoming surface toward the returning light emitting surface. The returning light incoming surface includes a first diffraction element to diffract and direct the returning light beams to a position on the returning light reflecting surface, and the returning light reflecting surface inlcudes a second diffraction element to correct for the difference of incidence angle, with respect to the returning light reflecting surface, between the returning light beams and directing the returning light beams toward the returning light emitting surface along the same optical axis, whereby the returning light emitting surface emits the returning light beams along the same optical axis.

According to a third aspect of the present invention, a compound optical unit comprises a housing including therein a light generating device having a plurality of light sources to emit laser beams, a light receiving device having a light receiving element to receive returning light beams emitted by a returning light emitting surface, and a compound optical device according to the second aspect of the invention, fixed to the housing. The housing includes a light incoming/emitting opening through which the laser beams emitted by an emission surface according to the second aspect are emitted and the returning light beams are received.

The compound optical unit may also comprise a package containing the light generating device.

In the compound optical unit according to the present invention, the first and second diffraction elements may be diffraction lattices which comprise rugged parts formed integrally with the returning light incoming surface and the returning light reflecting surface, respectively.

The light generating device may include two light sources for emitting laser beams having wavelengths in the 780 nm band and in the 650 nm band, respectively.

In the compound optical unit according to the present invention, the incidence surface may include a three-beam diffraction lattice that split each of the laser beams into three beams which are emitted by the emission surface, and returning light beams from an optical disk may be received by the light receiving element. With this arrangement, a signal for tracking control by a three beam method is outputted from the laser beams having a wavelength in the 780 nm band, and a signal for tracking control by a DPP (differential push-pull) method and a DPD (differential phase detection) method is outputted from the laser beams having a wavelength in the 650 nm band.

The compound optical device according to the present invention provided with the first and second diffraction elements and the three-beam diffraction lattice may be formed integrally with the first and second diffraction elements and the three-beam diffraction lattice by molding a resin.

According to a fourth aspect of the present invention, an optical pickup apparatus comprises the compound optical device; a light generating-device including a plurality of light sources to emit laser beams of different wavelengths and the optical axes parallel to each other at a predetermined distance from each other; a light receiving device having a light receiving element to receive returning light beams emitted by the returning light emitting surface; and an objective lens to condense the laser beams emitted by the emission surface onto an optical disk.

According to a fifth aspect of the present invention, an optical pickup apparatus comprises the compound optical unit, and an objective lens for condensing laser beams emitted by the emission surface onto an optical disk.

Another aspect of the invention comprises a method of positioning light beams of different wavelengths returning from an optical apparatus. The method comprises diffracting the returning light beams on a first surface of a compound optical device, reflecting the diffracted light beams on a second surface of the compound optical device, and correcting a trajectory of the diffracted light beams to focus the light beams on a light receiving device on the second surface-of the compound optical device.

The correcting may comprise re-diffracting the diffracted light beams along substantially the same optical axis.

The method may further comprise generating the light beams prior to the light beams impinging on the optical apparatus or forming a diffraction lattice integrally on the first surface to diffract the returning light beams and a correcting element integrally on the second surface to correct the trajectory of the diffracted light beams. In addition, the method may further comprise splitting the generated light beams into three light beams prior to the three light beams impinging on the optical apparatus and tracking and controlling the generated light beams.

The tracking and controlling may comprise a three-beam method, a DPP (differential push-pull) method, or a DPD (differential phase detection) method.

The method may further comprise condensing the generated light beams onto an optical disk.

DESCRIPTION OF THE PREFERRED EMBODIMENTS

A compound optical unit according to a first embodiment of the present invention is described below with reference to FIGS. 1 and 2.

Figure 1:
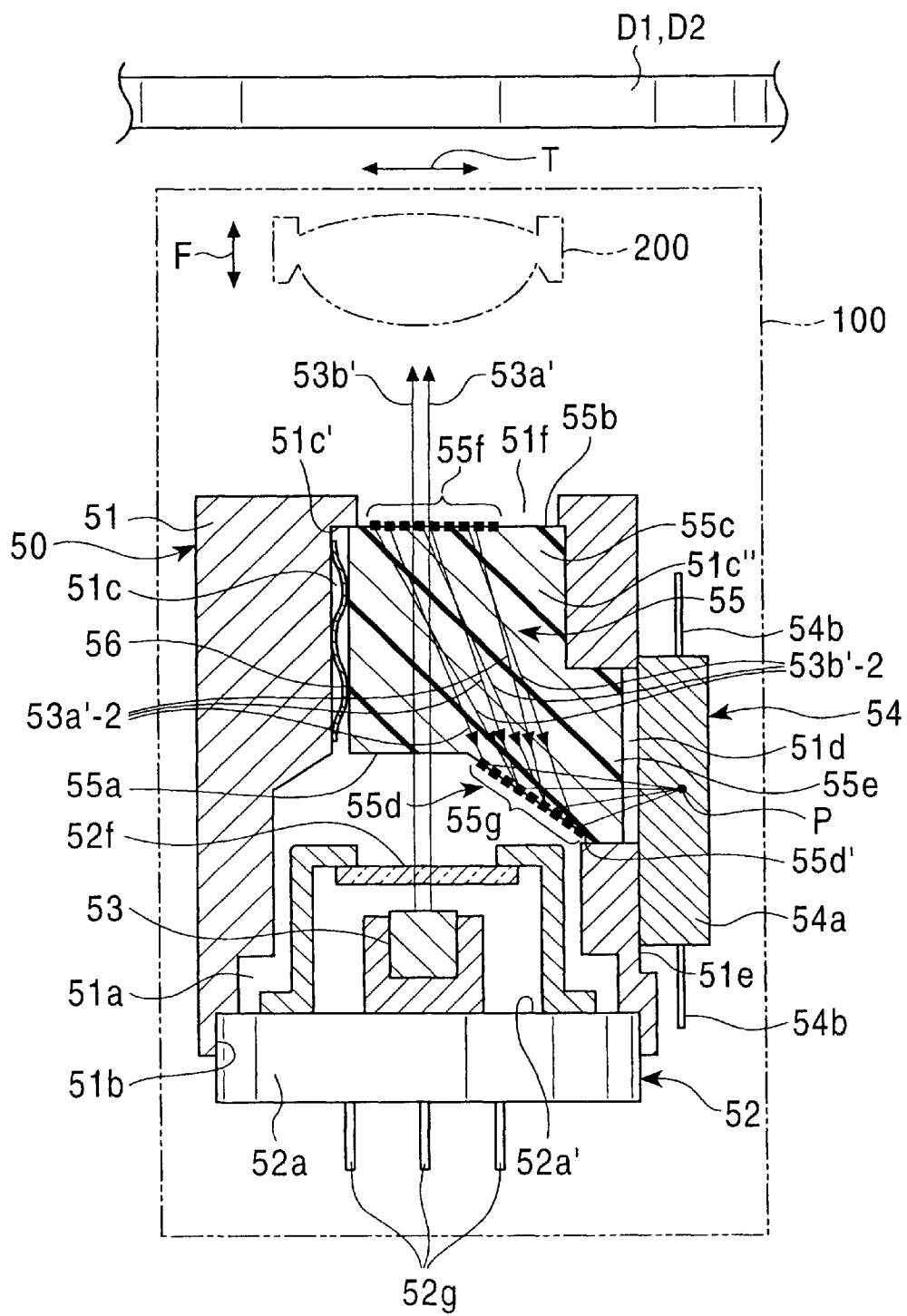
FIG. 1 is a partly-sectional side view of a compound optical unit according to a first embodiment of the present invention.

FIG. 1 a partly-sectional side view of an optical pickup apparatus 100 using a compound optical unit 50 according to a first embodiment of the present invention. The compound optical unit 50 is fixed to the optical pickup apparatus 100. The compound optical unit 50 is a light generating and receiving unit. The compound optical unit 50 reads from and writes on an optical disk D1 or D2 by using laser beams.

The optical pickup apparatus is disposed opposing the, optical disk D1 or D2, and is provided with an objective lens 101 supported movably in a focusing direction F perpendicular to the surface of the optical disk D1 or D2 and in a tracking direction T which is the radial direction of the optical disk D1 or D2.

In the present embodiment, the optical disk D1 is a DVD which is a high density optical disk, and the optical disk D2 is a CD (or CD-R) which is a low density optical disk.

The compound optical unit 50 includes, as major components, a semiconductor laser device 52, that is, a light generating device, a light receiving device 54, a compound optical device 55, and a housing 51 to which these components are fixed.

Figure 2:
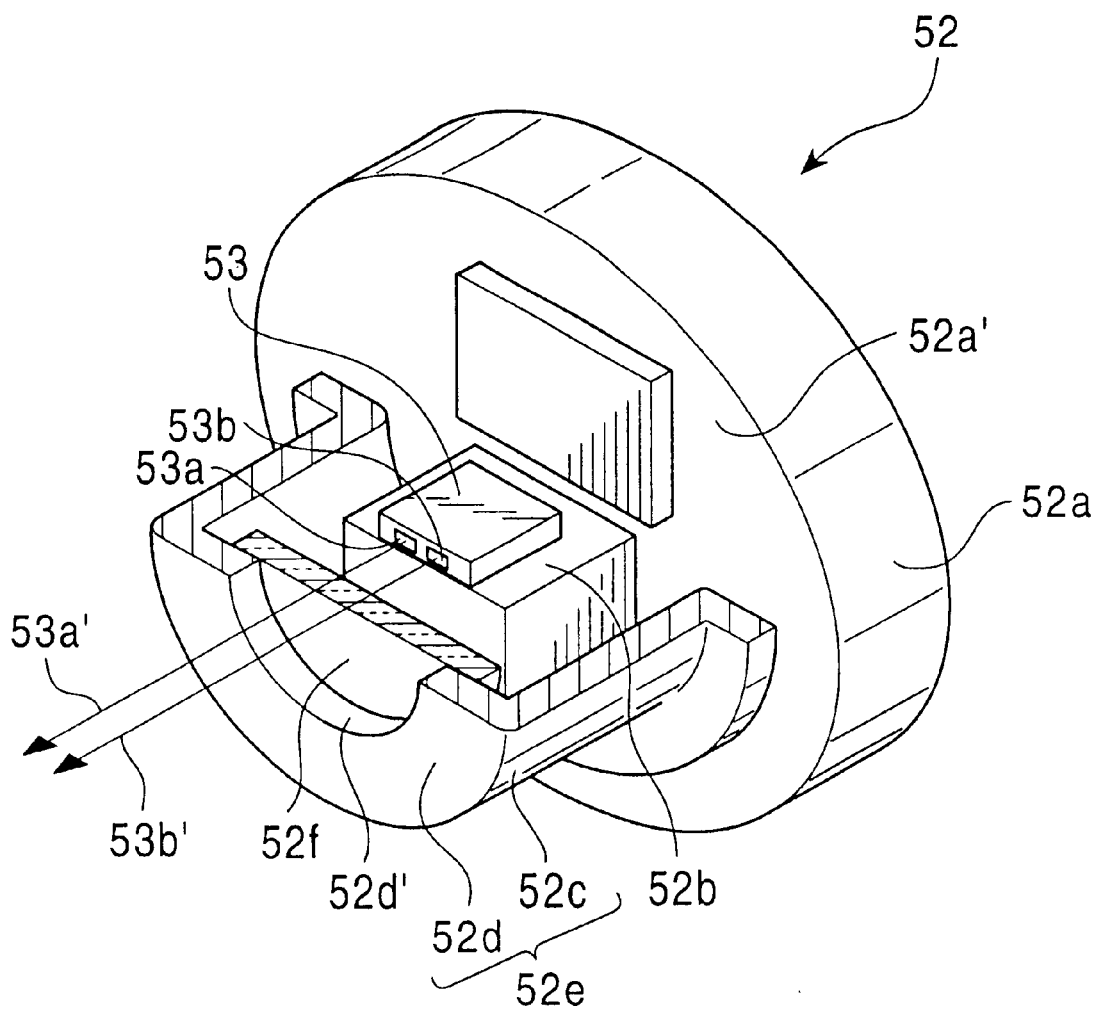
FIG. 2 is a partly-sectional perspective view of a semiconductor laser device 52 used in the compound optical unit shown in FIG. 1 according to the first embodiment of the present invention.

FIG. 2 is a partly-sectional perspective view of the semiconductor laser device 52. The semiconductor laser device 52 includes a circular substrate 52a, a rectangular base 52b protruding from a planar surface 52a' of the substrate 52a, and a laser chip 53 positioned on and fixed to a side wall of the base 52b. The semiconductor laser device 52 also includes a cap 52e including a cylindrical shell 52c and a top plate 52d provided therein with an opening 52d', the cap 52e being fixed to the surface 52a' of the substrate 52a so as to cover the base 52b, and a transparent circular glass plate 52f fixed so as to cover the opening 52d' from the inside of the cap 52e. The laser chip 53 is disposed in a closed space of a package defined by the substrate 52a, the cap 52e, and the glass plate 52f.

The laser chip 53 includes a laser diode 53a which is a light generating device for emitting laser beams having shorter waves (650 nm band) for a DVD, and a laser diode 53b which is a light generating device for emitting laser beams having longer waves (780 nm band) for a CD. Laser beams 53a' and 53b' which are emitted by the laser diodes 53a and 53b, respectively, are transmitted by the glass plate 52f in a direction perpendicular to the surface 52a' of the substrate 52a. In FIG. 1, external terminals 52g are protruding from a planar surface opposite to the surface 52a' of the substrate 52a. Driving current for the laser diodes 53a and 53b is supplied through the external terminals 52g.

The light receiving device 54 includes a package 54a including a light receiving element (not shown) which is a PIN photodiode, and external terminals 54b protruding from sides of the package 54a. Supply voltage for the light receiving element is supplied and output signals photoelectrically converted by the light receiving element are outputted through the external terminals 54b.

In FIG. 1, the compound optical device 55 made of a highly transparent resin includes a rectangular parallelepiped portion 55c having an incidence surface 55a and an emission surface 55b parallel to each other, an inclined surface 55d formed continuously from the incidence surface 55a, and a protruding portion 55e protruding from a side surface of the rectangular parallelepiped portion 55c. The emission surface 55b is provided with a diffraction lattice 55f which is a diffraction element having a predetermined pitch. The inclined surface 55d is coated with an optical film (not shown), thereby providing a reflective surface 55d' at the inner side of the inclined surface 55d. The reflective surface 55d' is provided with a reflective diffraction lattice 55g which is a correction element having a predetermined pitch. According to the present embodiment, the compound optical device 55 is formed integrally with the diffraction lattices 55f and 55g by using a molding die. Although the compound optical device 55 is made of a resin according to the embodiment, glass may be used as the material. The diffraction lattice 55g provided on the reflective surface 55d' is described below in detail.

The housing 51 made from a metallic block is provided with a mounting hole 51a at an intermediate part toward a lower part of the housing 51 for mounting the semiconductor laser device 52, and a mounting hole 51b at the lower end thereof for positioning the semiconductor laser device 52. The housing 51 is provided with a mounting hole 51c at an intermediate part toward the upper part thereof for mounting the compound optical device 55, the mounting hole 51c communicating with the mounting hole 51a. Restricting faces 51c' and 51c" are formed at the upper end and a side wall of the housing 51, respectively, the restricting faces 51c' and 51c" being for positioning the compound optical device 55. A through-hole 51d is formed at an intermediate part in a vertical direction of the housing 51 at the restricting face 51c" side. An outer surface of the housing 51 provided with the through-hole 51d therein is provided with a mounting face 51e thereon for positioning and mounting the light receiving device 54. The end of the restricting face 51c' and the inner wall of the housing 51 define an opening 51f at the uppermost part of the housing 51. The diffraction lattice 55f provided on the compound optical device 55 is exposed through the opening 51f. The housing 51 is made from a metallic block being cylindrical, rectangular parallelepiped, or of the other polyhedral shape. The housing 51 may be formed with a resin block.

The semiconductor laser device 52, the light receiving device 54, and the compound optical device 55 are assembled to the housing 51 as described below with reference to FIG. 1.

The compound optical device 55 is inserted to the mounting hole 51c at the rectangular parallelepiped portion 55c thereof, and mates with through-hole 51d at the protruding portion 55e of the compound optical device 55. The compound optical device 55 is positioned and fixed to the housing 51 by an adhesive or the like, in which the emission surface 55b which is an upper surface of the parallelepiped portion 55c is brought into contact with the restricting face 51c' at the upper end of the housing 51, and the side surface of the rectangular parallelepiped portion 55c is brought into contact with the restricting face 51c" of the housing 51 urged by a corrugated blade spring 56.

The semiconductor laser device 52 is inserted to the mounting hole 51a of the housing 51 at the cap 52e of the semiconductor laser device 52, and mates with the mounting hole 51b formed in the housing 51 at the periphery of the planar surface 52a' of the substrate 52a of the semiconductor laser device 52, thereby positioning and fixing the semiconductor laser device 52 to the housing 51.

The light receiving device 54 is positioned and fixed to the mounting face 51e of the housing 51 by an adhesive or the like so that the light receiving element of the light receiving device 54 opposes the through-hole 51d of the housing 51. The light receiving device 54 is disposed at an angle of 90 degrees with respect to the semiconductor laser device 52. The returning laser beams of the laser beams 53a' and 53b' emitted by the laser diodes 53a and 53b, respectively, are adjusted in accordance with a predetermined reference optical system so as to be led to a predetermined position P of the light receiving device 54 after diffracted by the diffraction lattices 55f and 55g, then the light receiving device 54 is fixed to the mounting face 51e.

Reading from the DVD D1 and the CD D2 is performed as follows.

When reading from the DVD D1 in the present embodiment, the laser beams 53a' emitted by the laser diode 53a of the semiconductor laser device 52 are transmitted by the incidence surface 55a of the compound optical device 55 and by the diffraction lattice 55f, and are emitted by the emission surface 55b of the compound optical device 55. The laser beams 53a' are applied to an objective lens 200 and are focused on a data recording surface of the DVD D1 by a condensing effect of the objective lens 200.

The laser beams 53a' reflected by the DVD D1 are transmitted by the objective lens 200, applied to the diffraction lattice 55f, and are diffracted thereby at a predetermined diffraction angle, the diffracted laser beams being hereinafter denoted by laser beams 53a'-2. The laser beams is 53a'-2 are reflected by the reflective surface 55d' formed on the inner side of the inclined surface 55d of the compound optical device 55, and are applied to the light receiving device 54 at the light receiving position P of the light receiving element thereof. In this case, the laser beams applied to the light receiving element are photoelectrically converted so as to form a read signal which is a voltage signal converted from an electric current outputted in response to a signal from the data recorded surface of the DVD D1, the read signal being outputted through the external terminals 54b of the light receiving device 54. A part of the laser beams incident to the light receiving device 54 is used for focusing and tracking control.

When reading from the CD D2, the laser beams 53b' emitted by the laser diode 53b of the semiconductor laser device 52 are transmitted by the incidence surface 55a of the compound optical device 55 and by the diffraction lattice 55f, and are emitted by the emission surface 55b. The laser beams 53b' are applied to the objective lens 200 and are focused on the data recording surface of the CD D2 by a condensing effect of the objective lens 200.

The laser beams 53b' reflected by the CD D2 are transmitted by the objective lens 200, applied to the diffraction lattice 55f, and are diffracted thereby at a predetermined diffraction angle, the diffracted laser beams being hereinafter denoted by laser beams 53b'-2. The laser beams 53b'-2 are reflected by the reflective surface 55d' formed on the inner side of the inclined surface 55d of the compound optical device 55, and are applied to the light receiving device 54 at the light receiving position P of the light receiving element thereof. In this case, the laser beams applied to the light receiving element are photoelectrically converted so as to form a read signal which is a voltage signal converted from an electric current outputted in response to a signal from the data recording surface of the CD D2, the read signal being outputted through the external terminals 54b of the light receiving device 54. A part of the laser beams incident to the light receiving device 54 is used for focusing and tracking control.

The optical pickup apparatus 100 according to the present invention may be provided, as needed, with additional components, such as a collimator lens for collimating the laser beams 53a' and 53b', and a wavelength filter for restricting the diameter of light fluxes.

The diffraction lattice 55g formed on the reflective surface 55d' of the compound optical device 55 is described below with reference to FIG. 1.

As described above, the laser beams 53a' and 53b' reflected from the DVD D1 and CD D2, respectively, are diffracted by the diffraction lattice 55f of the compound optical device 55, the diffracted laser beams being denoted by the laser beams 53a'-2 and 53b'-2, respectively. In this case, the diffracted laser beams 53b'-2 from the CD D2 have a greater angle of diffraction than that of the diffracted laser beams 53a'-2 from the DVD D1, as shown in FIG. 1, because the wavelengths of the laser beams used for the CD D2 are longer than those of the laser beams used for the DVD D1.

Therefore, when the laser beams 53a'-2 and 53b'-2 are simply reflected at the reflective surface 55d' of the compound optical device 55, the laser beams 53a'-2 and 53b'-2 do not coincide with each other on the light receiving position P of the light receiving device 54. In order to correct for this fact, the reflective surface 55d' is provided with the diffraction lattice 55g serving as a correction element.

The diffraction lattice 55g is designed as described below. When it is assumed that the laser beams for the DVD D1 and the laser beams for the CD D2 are emitted toward the diffraction lattice 55g from the light receiving position P of the light receiving device 54, the laser beams for the CD D2, of which the wavelength is longer than that of the laser beams for the DVD D1, are emitted toward an outer side of the laser beams for the DVD D1 when diffracted by the diffraction lattice 55g (the diffraction angle of the laser beams for the CD D2 is greater than that of the other) due to the characteristics of diffraction lattices. Therefore, the position of the diffraction lattice 55g on the compound optical device 55 is designed so that the assumed laser beams for the CD D2 having a greater wavelength coincide with the optical axis of the laser beams 53b'-2 diffracted by the diffraction lattice 55f of the compound optical device 55, and the assumed laser beams for the DVD D1 having a smaller wavelength coincide with the optical axis of the laser beams 53a'-2 diffracted by the diffraction lattice 55f of the compound optical device 55.

Thus, the laser beams 53a'-2 and 53b'-2 diffracted by the diffraction lattice 55f are corrected so as to coincide with each other on the light receiving position P of the light receiving device 54.

According to the present embodiment described above, as shown in FIG. 1, the optical pickup apparatus 100 includes the housing 51 to which the semiconductor laser device 52, the light receiving device 54, and the compound optical device 55 are fixed. The semiconductor laser device 52 includes the laser diode 53a which emits a laser having shorter wavelengths for a DVD and the laser diode 53b which emits a laser having longer wavelengths for a CD. The compound optical device 55 includes the incidence surface 55a and the emission surface 55b for receiving the light from the semiconductor laser device 52 and for emitting the light received from the semiconductor laser device 52, respectively, the diffraction lattice 55f disposed on the emission surface 55b for diffracting the returning light from the optical disk D1 or D2, and the reflective surface 55d' for reflecting the light diffracted by the diffraction lattice 55f toward the light receiving device 54. The reflective surface 55d' is provided thereon with the diffraction lattice 55g so as to focus laser beams of different wavelengths on the same light receiving position P of the light receiving device 54, whereby the compound optical unit 50 can be used in the optical pickup apparatus 100 which processes laser beams of different wavelengths by one compound optical unit. In the optical pickup apparatus 100, only one light receiving device 54 is required, whereby the increase in costs in adjustment processes can be suppressed by limiting the adjustment to that in the positioning of the light receiving device 54.

The semiconductor laser device 52 is configured with a package formed by the substrate 52a, the cap 52e, and the glass plate 52f, and with the external terminals 52g. The light receiving device 54 is a so-called "discrete part" which includes the package 54a including a light receiving element, and the external terminals 54b provided on the package 54a. The compound optical unit 50 is configured with components which can be independently manufactured at low cost, the components being easy to handle, thereby making the assembly to the housing 51 simple, whereby material and manufacturing costs are reduced.

The diffraction lattice 55g used for correction is formed integrally with the reflective surface 55d' of the compound optical device 55 which is made of a resin. By using a diffraction lattice which is a common optical device having a simple structure, the structure of the correction unit can be made simple, the diffraction lattice 55g can be easily formed on the compound optical device 55, thereby reducing material costs of the compound optical device 55.

The incidence surface 55a and the emission surface 55b are disposed substantially in parallel to each other, and the semiconductor laser device 52 is disposed in the housing 51 so that the optical axes of the laser beams 53a' and 53b' to be emitted by the semiconductor laser device 52 are substantially perpendicular to the emission surface 55b. The reflective surface 55d' for leading the laser beams diffracted by the diffracting lattice 55f, which have been reflected from the optical disk D1 or D2, toward the light receiving element of the light receiving device 54 is disposed at the inner side of the inclined surface 55d inclined with respect to the emission surface 55b. The light receiving device 54 is disposed at an angle of 90 degrees with respect to the semiconductor laser device 52. With this arrangement, the semiconductor laser device 52 and the light receiving device 54 can be disposed compactly in the housing 51 instead of occupying a large space by disposing the semiconductor laser device 52 and the light receiving device 54 parallel to each other in the housing 51, whereby the compound optical unit 50 can be made in a practical size.

The compound optical unit 50 is made of a resin which is an economical material, and the diffraction lattices 55f and 55g are formed integrally with the compound optical unit 50, thereby reducing the molding time and further reducing costs of the compound optical device 55.

The compound optical unit 50 according to the embodiment of the present invention is provided with the objective lens 200 and can be used in the optical pickup apparatus 100 for reading from and writing on the optical disks D1 and D2.

Figure 18:
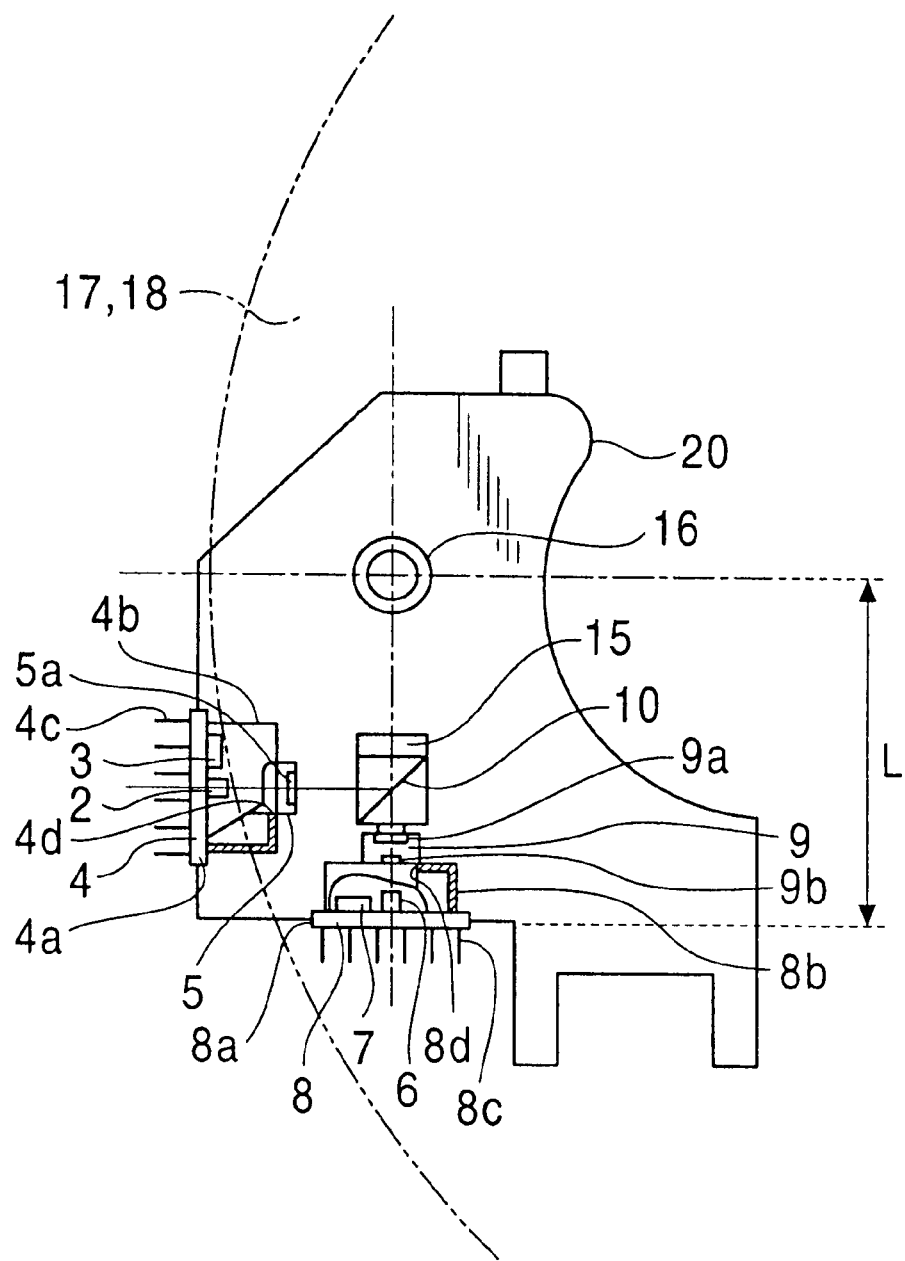
FIG. 18 is a plan view of an optical pickup apparatus using a known optical unit.

The compound optical unit 50 according to the present invention can be also used in a compound optical unit, such as the optical unit 4 shown in FIG. 18, which includes an optical device 5 having a substrate 4a, a side wall 4b, and an emission part 4d which is an opening formed in the side wall 4b. The substrate 4a is provided thereon with a light source (light generating element) and a light receiving device (light receiving element), and the side wall covers the light source and the light receiving device. According to this embodiment, the compound optical unit includes a laser diode chip serving as a light generating element, a light receiving device formed by a process similar to a semiconductor manufacturing process or the like and disposed on the substrate, and a diffraction lattice, which is a correction element, disposed on the compound optical device (optical device), whereby the compound optical unit can be reduced in size.

Although the semiconductor laser device 52 shown in FIG. 2, according to the embodiment, has two laser diodes 53a and 53b which generate laser beams having two different wavelengths, the compound optical unit according to the present invention may include a light generating device for generating laser beams having three or more different wavelengths.

The compound optical unit according to the present invention can be used in optical apparatuses other than the optical pickup apparatus, and each uses a plurality of light sources for generating light beams having a plurality of wavelengths.

An optical pickup apparatus 100 according to a second embodiment of the present invention is described below with reference to the drawings.

Figure 3:
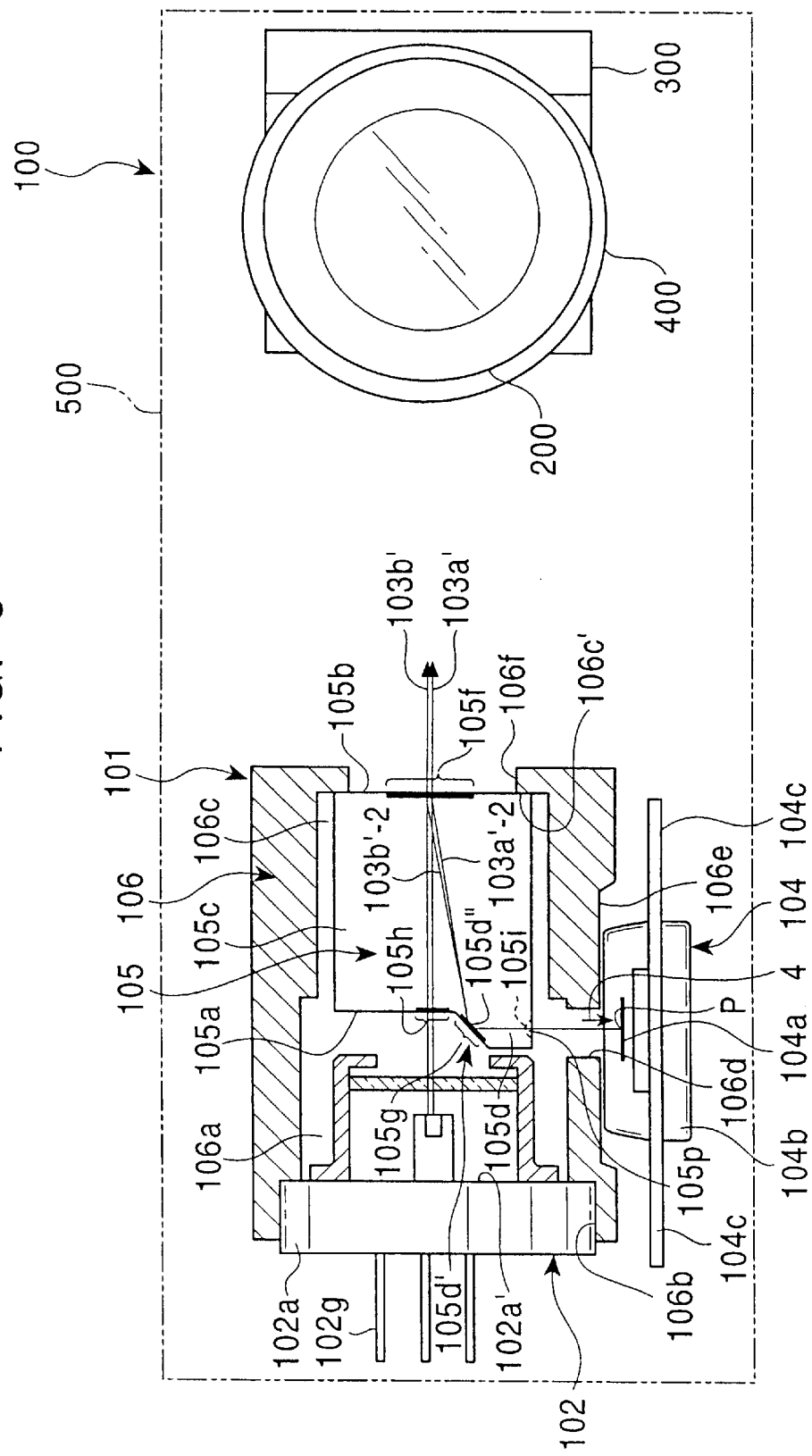
FIG. 3 is a partly-sectional plan view of an optical pickup apparatus according to a second embodiment of the present invention.
Figure 4:
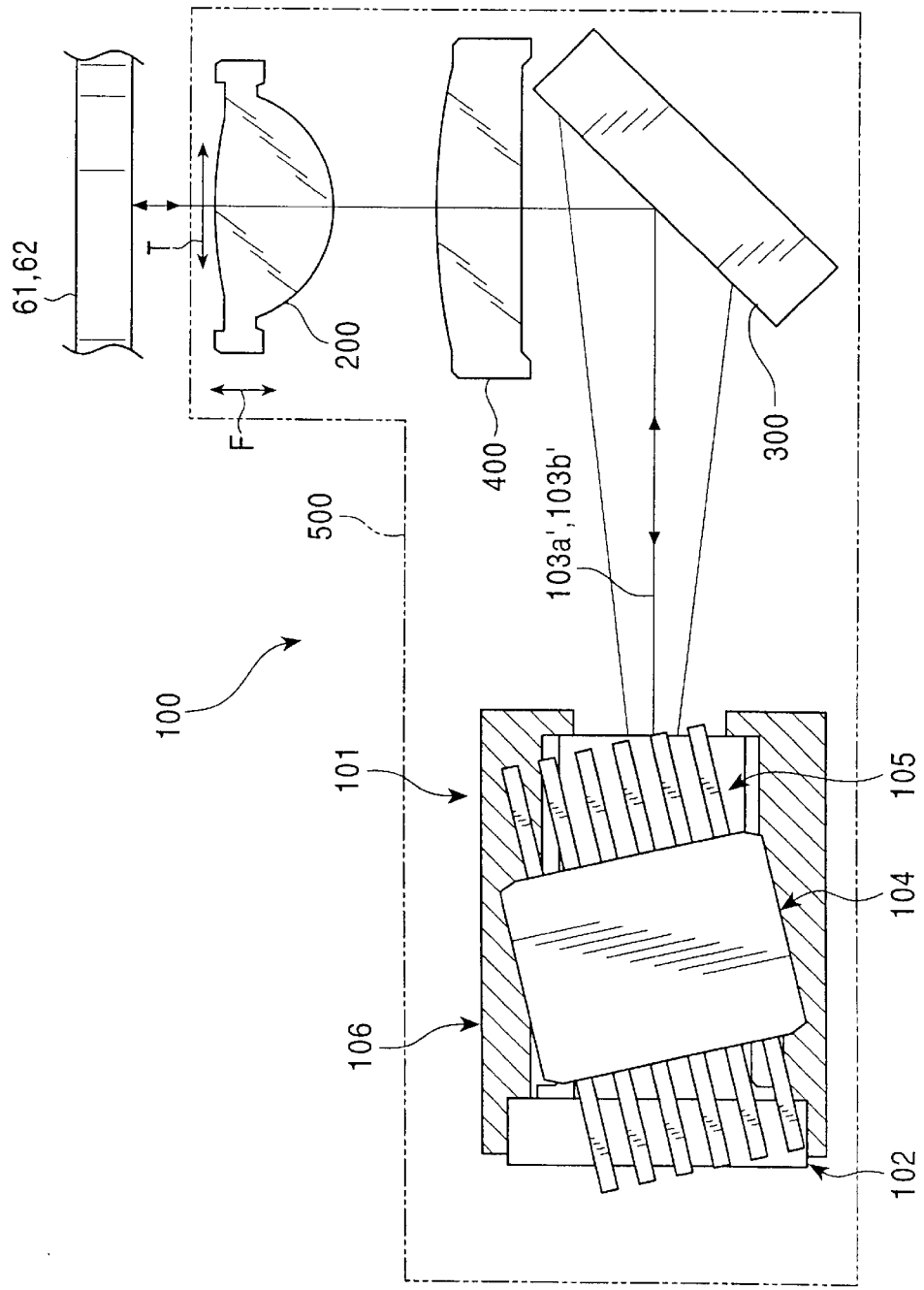
FIG. 4 is a partly-sectional side view of the optical pickup apparatus according to the second embodiment of the present invention.
Figure 5:
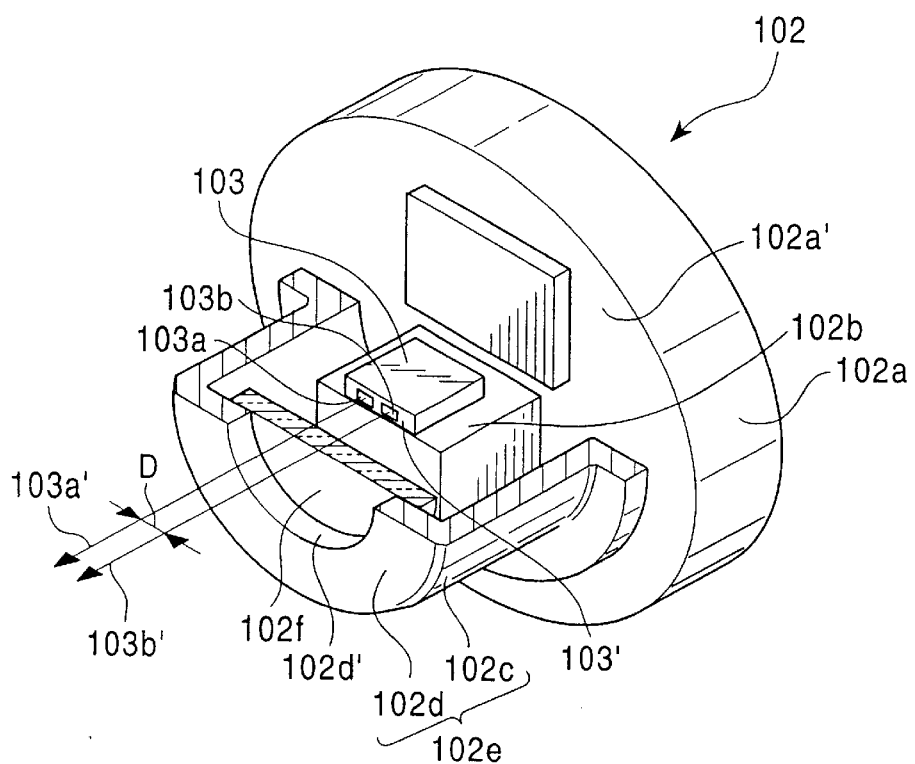
FIG. 5 is a partly-sectional perspective view of a two-wavelength laser diode used in an optical pickup apparatus according to the second embodiment of the present invention.

FIG. 3 is a partly-sectional plan view of the optical pickup apparatus 100 according to the second embodiment of the present invention. FIG. 4 is a partly-sectional side view of the optical pickup apparatus 100. FIG. 5 is a partly-sectional perspective view of a two-wavelength laser diode 102.

In FIGS. 3 and 4, the optical pickup apparatus 100 includes, as major components, a carriage 500, a compound optical unit 101 contained in the carriage 500, a flat reflective mirror 300, a collimator lens 400, and an objective lens 200. The optical pickup apparatus 100 opposes a CD 61 or a DVD 62. The objective lens 200 is supported movably in a focusing direction perpendicular to the surface of the CD 61 or the DVD 62 and in a tracking direction which is the radial direction of the CD 61 or the DVD 62. The objective lens 200 operates for the CD 61 and the DVD 62. The CD 61 is an optical disk, such as a CD, a CD-R, or a CD-RW, and the DVD 62 is an optical disk, such as a DVD, a DVD-R, a DVD-RW, a DVD-ROM, or a DVD-RAM.

The compound optical unit 101 is a light generating/receiving optical unit which applies laser to an optical disk, and reads data recorded on the optical disk and writes data on the optical disk.

The compound optical unit 101 is described below in detail.

In FIG. 3, the compound optical unit 101 includes, as major components, a two-wavelength laser diode 102 which is a light generating device, a light receiving device 104 including therein a light receiving element 104a, a compound optical device 105, and a housing 106 to which these major components are fixed.

In FIG. 5, the two-wavelength laser diode 102 includes a circular substrate 102a, a rectangular parallelepiped base 102b protruding from a surface 102a' of the substrate 102a, a laser chip 103 positioned on the base 102b and fixed thereto, a cap 102e including a cylindrical shell 102c and a top plate 102d provided therein with an opening 102d', the cap 102e being fixed to the surface 102a' so as to cover the base 102b, and a transparent circular glass plate 102f fixed so as to cover the opening 102d' from the inside of the cap 102e. The laser chip 103 is disposed in a closed space of a package defined by the substrate 102a, the cap 102e, and the glass plate 102f.

The laser chip 103 includes a light source 103a for emitting laser beams 103a' having shorter wavelengths (650 nm band) for DVDs, and a light source 103b for emitting laser beams having longer wavelengths (780 nm band) for CDs, the light sources 103a and 103b being disposed adjacent to each other across a gap D therebetween. According to the present embodiment, the gap D is set to 120 µm. Laser beams having a wavelength of 635 nm or 650 nm are particularly used for the above-described 650 nm band, according to the DVD standards.

The laser beams 103a' and 103b' which are emitted by the light sources 103a and 103b, respectively, are transmitted by the glass plate 102f parallel to each other in a direction perpendicular to the surface 102a' of the substrate 102a. The position of emission of the laser beams 103a' and 103b' is disposed on the same plane as an end face 103' of the laser chip 103, the end face 103' being parallel to the surface 102a'. In FIG. 3, a plurality of external terminals 102g are protruding from a surface opposite to the surface 102a' of the substrate 102a. Driving current for the laser chip 103 is supplied through the external terminals 102g.

In a process of manufacturing the two-wavelength laser diode 102, the laser chip 103 having the two light sources 103a and 103b is manufactured on a given substrate by a method similar to a semiconductor manufacturing process, in which the light sources 103a and 103b can be easily formed across the gap D accurately in a predetermined size without variations between products. Therefore, mass production is possible as a discrete part, thereby reducing costs of the two-wavelength laser diode 102.

As shown in FIG. 3, the light receiving device 104 includes a package 104b containing the light receiving element 104a and external terminals 104c protruding from two sides of the package 104b. Supply voltage for the light receiving element 104a is supplied and signals photoelectrically converted by the light receiving element 104a are outputted through the external terminals 104c.

Figure 6:
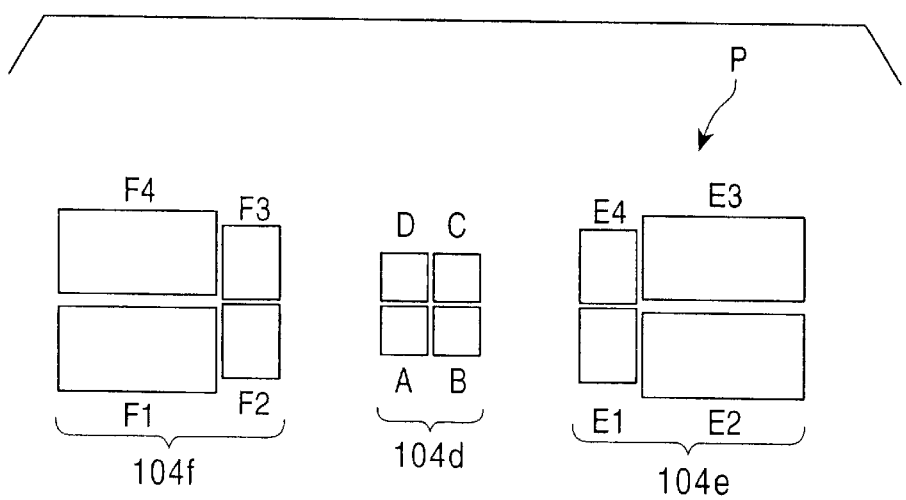
FIG. 6 is a plan view, in a direction of an arrow 4, of a light receiving element of the optical pickup apparatus shown in FIG. 3 according to the second embodiment of the present invention.

FIG. 6 is a plan view in a direction 4 of the light receiving element 104a shown in FIG. 3. The light receiving element 104a has a light receiving pattern P which includes a photodiode 104d divided into four rectangular photodiodes A, B, C, and D disposed vertically and horizontally symmetrically and photodiodes 104e and 104f provided with the photodiode 104d therebetween, each of the photodiodes 104e and 104f being divided into four. The photodiode 104e includes small rectangular photodiodes E1 and E4 disposed vertically symmetrically and large rectangular photodiodes E2 and E3 disposed vertically symmetrically. In the same fashion, the photodiode 104f includes small rectangular photodiodes F1 and F4 disposed vertically symmetrically and large rectangular photodiodes F2 and F3 vertically symmetrically. Although photodiodes are used as the light receiving element 104a, other light receiving devices may be used as the light receiving element 104a.

In FIG. 3, the compound optical device 105 made of a highly transparent resin includes a columnar portion 105c having an incidence surface 105a and an emission surface (returning light incoming surface) 105b parallel to each other, and a trapezoidal portion 105d integrally formed so as to protrude from the incidence surface 105a and having an inclined surface 105d'.

The emission surface 105b is provided with a first diffraction element, that is, a first diffraction lattice 105f. The inclined surface 105d' is coated with an optical film (not shown), thereby providing a returning light reflecting surface 105d" at the inner side of the inclined surface 105d'. The returning light reflecting surface 105d" is provided with a reflective second diffraction lattice 105g. A three-beam diffraction lattice 105h is formed on the incidence surface 105a. The surface of the protruding portion 105d opposite to the returning light reflecting surface 105d" is provided with a cylindrical surface 105i for controlling focus by an astigmatic method. The lower side surface of the cylindrical surface 105i serves as a returning light emitting surface 105p. According to the present embodiment, the compound optical device 105 is formed integrally with the first and second diffraction lattices 105f and 105g, the three-beam diffraction lattice 105h, and the cylindrical surface 105i by using a molding die.

Although the compound optical device 105 is made of a resin, according to the embodiment, glass may be used as a material. Although the emission surface 105b serves as the returning light incoming surface, according to the embodiment, an emission surface and a returning light incoming surface may be provided independently from each other, and a first diffraction lattice may be formed on the independent returning light incoming surface. The first and second diffraction lattices 105f and 105g, the three-beam diffraction lattice 105h, and the shape of the compound optical device 105 are described below in detail.

In FIG. 3, the housing 106 made from a metallic cylindrical block is provided with a receiving hole 106a formed from an intermediate part toward the left end of the housing 106 in the drawing for receiving the two-wavelength laser diode 102, and a mounting hole 106b formed at the left end of the housing 106 for positioning and mounting the two-wavelength laser diode 102. The housing 106 is provided with a receiving hole 106c formed from the intermediate part toward the right end of the housing 106 for receiving the compound optical device 105, the receiving hole 106c communicating with the receiving hole 106a. A restricting face 106c' is formed at the right end of the housing 106 (to the right of the receiving hole 106c) for positioning the compound optical device 105. A through-hole 106d is formed in the side wall of the housing 106 at the lower side in the drawing. An outer surface of the housing 106 provided with the through-hole 106d therein is provided with a mounting face 106e thereon for mounting the light receiving device 104. An opening 106f is formed at the right end in the drawing of the housing 106, defined by the end of the restricting face 106c', the opening 106f being a light receiving/emitting aperture. The first diffraction-lattice 105f provided on the compound optical device 105 is exposed through the opening 106f.

The housing 106 is made from a block made by aluminum die-casting, or zinc die-casting, or is made of a magnesium alloy or other metallic material. The housing 106 has a cylindrical, rectangular parallelepiped, or other polyhedral shape. The housing 106 may have a columnar shape having a predetermined section. The housing 106 may be formed with a resin block.

The assembly into the housing 106 of the two-wavelength laser diode 102, the light receiving device 104, and the compound optical device 105 is described below with reference to FIG. 1.

The compound optical device 105 is inserted by using a given jig (not shown) into the receiving hole 106c of the housing 106 at the columnar portion 105c, and is brought into contact with the restricting face 106c' formed at the end of the receiving hole 106c of the housing 106 at the periphery of the emission surface 105b, thereby positioning the compound optical device 105 in the housing 106. Then, the compound optical device 105 is fixed by an adhesive or the like (not shown) at the periphery thereof to a predetermined position such as the inner wall of the receiving hole 106c.

The two-wavelength laser diode 102 is inserted into the receiving hole 106a of the housing 106 at the cap 102e of the two-wavelength laser diode 102 (see FIG. 3), and mates with the mounting hole 106b formed in the housing 106 at the periphery of the surface 102a' of the substrate 102a of the two-wavelength laser diode 102, thereby positioning and fixing the two-wavelength laser diode 102 to the housing 106 by an adhesive or the like (not shown).

The light receiving device 104 is positioned at a predetermined position and is fixed to the mounting face 106e of the housing 106 by an adhesive or the like (not shown) so that the light receiving element 104a of the light receiving device 104 opposes the through-hole 106d of the housing 106. The light receiving device 104 is disposed at an angle of 90 degrees with respect to the emission surface 105b of the compound optical device 105. The returning laser beams of the lasers 103a' and 103b' emitted by the light sources 103a and 103b, respectively, are adjusted in accordance with a predetermined reference optical system so as to be led to a predetermined pattern P of the light receiving element 104a after being diffracted by the first and second diffraction lattices 105f and 105g, then the light receiving device 104 is fixed to the mounting face 106e.

Reading from the DVD 62 and the CD 61 is performed as follows.

When reading from the DVD 62 in the present embodiment, as shown in FIG. 3, the laser beams 103a' emitted by the light source 103a of the two-wavelength laser diode 102 are transmitted by the three-beam diffraction lattice 105h formed on the incidence surface 105a of the compound optical device 105, thereby being split into three beams, are transmitted by the first diffraction lattice 105f, and are emitted by the emission surface 105b. As shown in FIG. 4, the laser beams 103a' are deflected by 90 degrees by the reflective mirror 300 disposed at an angle of 45 degrees with respect to the direction of travel of the laser beams 103a', and are applied to the collimator lens 400 disposed upwardly from the reflective mirror 300. The laser beams 103a' substantially collimated by the collimator lens 400 are applied to the objective lens 200 and focused on a data recording surface of the DVD 62 by a condensing effect of the objective lens 200.

The laser beams 103a' reflected by the DVD 62 (returning light) are transmitted by the objective lens 200 and the collimator lens 400, are reflected by the reflective mirror 300, are applied to the first diffraction lattice 105f formed on the emission surface 105b which is the returning light incoming surface shown in FIG. 3, and are diffracted by the first diffraction lattice 105f at a predetermined diffraction angle. A first-order diffracted returning light beams 103a'-2 which are the laser beams 103a' diffracted by the first diffraction lattice 105f are reflected by the returning light reflecting surface 105d" formed in the compound optical device 105, and are applied to the light receiving patter P of the light receiving element 104a of the light receiving device 104. In this case, the returning light beams 103a'-2 applied to the light receiving element 104a are photoelectrically converted so as to form a read signal which is a voltage signal converted from an electric current outputted[ ]in response to a signal from the data recorded surface of the DVD 62, the read signal being outputted through the external terminals 104b of the light receiving device 104. A part of the returning light beams 103a'-2 incident on the light receiving element 104a is used for focusing and tracking control.

When reading from the CD 61, the laser beams 103b' emitted by the light source 103b of the two-wavelength laser diode 102 are transmitted, as shown in FIG. 3, by the three-beam diffracted lattice 105h formed on the incidence surface 105a of the compound optical device 105 and are split into three beams, then transmitted by the first diffraction lattice 105f, and are emitted by the emission surface 105b. The laser beams 103b' are applied to the objective lens 200 in the same way as in the case of the DVD 62 and are focused on the data recording surface of the CD 61 by a condensing effect of the objective lens 200.

The laser beams 103b' reflected by the CD 61 are transmitted by the objective lens 200 and collimator lens 400, reflected by the reflective mirror 300, applied to the first diffraction lattice 105f, and converted into a first-order diffracted returning light beams 103b'-2 by being diffracted by the first diffraction lattice 105f at a predetermined diffraction angle. The returning light beams 103b'-2 are reflected by the returning light reflecting surface 105d" formed in the compound optical device 105, and are applied to the light receiving pattern P of the light receiving element 104a of the light receiving device 104. In this case, the returning light beams 103b'-2 applied to the light receiving element 104a rare photoelectrically converted so as to form a read signal which is a voltage signal converted from an electric current outputted in response to a signal from the data recording surface of the CD 61, the read signal being outputted through the external terminals 104b of the light receiving device 104. A part of the returning light beams 103b'-2 incident on the light receiving element 104a is used for focusing and tracking control.

The optical pickup apparatus 100 according to the present invention may be provided with additional components, such as a wavelength filter for restricting the diameter of light fluxes of the laser beams 103a' and 103b' emitted by the emission surface 105b, in the light path between the emission surface 105b and the objective lens 200.

The shape and the function of the compound optical device 105, and the details of the first and second diffraction lattices 105f and 105g formed in the compound optical device 105 are described below with reference to FIG. 7.

Figure 7:
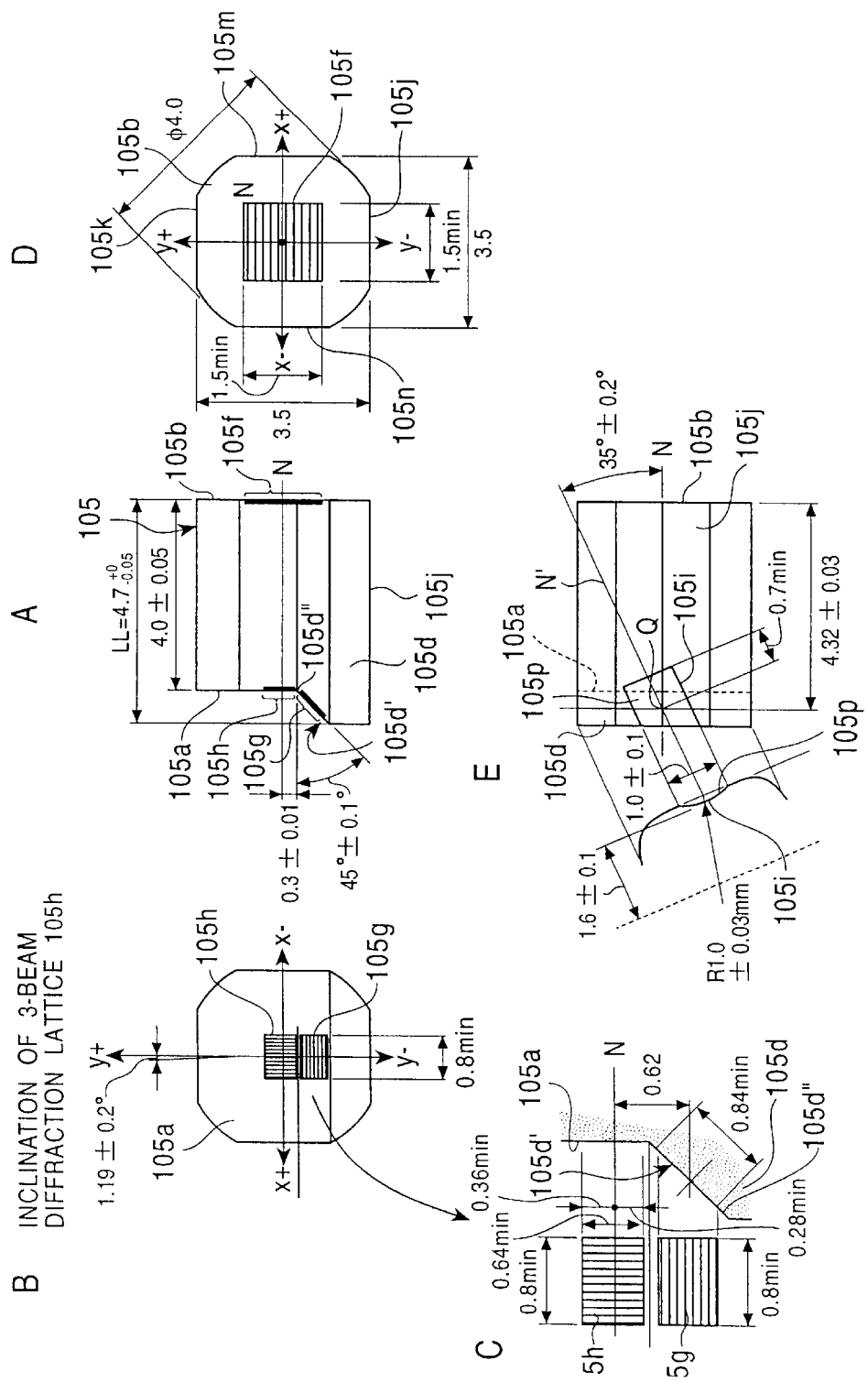
FIG. 7 includes a plan view A of a compound optical unit, a side view B from the side of an incidence surface of the compound optical unit, an expanded view C of a second diffraction lattice and a three-beam diffraction lattice, a side view D from the side of an emission surface of the compound optical unit, and a front view E of the compound optical unit, which are used in the optical pickup apparatus according to the second embodiment of the present invention.

A plan view A in FIG. 7 shows the compound optical device 105. A side view B in FIG. 7 shows the compound optical device 105 from the incidence surface 105a side. An expanded view C in FIG. 7 shows the second diffraction lattice 105g and the three-beam diffraction lattice 105h. A side view D in FIG. 7 shows the compound optical device 105 from the emission surface 105b side. A front view E in FIG. 7 shows the compound optical device 105.

As shown by the plan view A and the side view D, the compound optical device 105 is formed in a manner such that a cylindrical resin block (N represents the central line) having a diameter of 4 mm and a length LL=4.7 mm (the tolerance is shown in the drawings) is cut away at four portions at the periphery thereof, each cut-away portion having a flat surface 105j, 105k, 105m, or 105n, so that the adjacent flat surfaces are disposed perpendicular to each other. The distance between two flat surfaces opposite to each other, that is, between the flat surfaces 105j and 105k or between the flat surfaces 105m and 105n is set to 3.5 mm.

The cylindrical resin block is also cut away at an end thereof opposite to the end at which the emission surface 105b is provided, so as to form the incidence surface 105a and the protruding portion 105d. The distance between the incidence surface 105a and the emission surface 105b is 4.0 mm. As shown by the plan view A, the root of the flank of the inclined surface 105d' formed at the protruding portion 105d is disposed toward the flat surface 105j side by 0.3 mm from the central line N of the incidence surface 105a. The angle of inclination of the inclined surface 105d' is 45 degrees with respect to the central line N.

As shown by the front view E, a groove R forming the cylindrical surface 105i, of which the section has a radius of 1.0 mm, is formed extending from the protruding portion 105d side of the flat surface 105j along a reference line N' disposed at an angle of 35 degrees with respect to the central line N. The length of the cylindrical surface 105i along the reference line N' is 0.7 mm at the minimum (hereinafter referred to as min) from a point Q at which the reference line N' intersects with the central line N, the point Q being at 4.32 mm from the emission surface 105b. The returning light beams 103a'-2 and 103b'-2 shown in FIG. 3 are emitted from the point Q toward the light receiving pattern P. The groove R of the cylindrical surface 105i serves as the returning light emitting surface 105p.

As shown by the side view D, the first diffraction lattice 105f formed on the emission surface 105b has a shape of a 1.5 mm (min) square. The first diffraction lattice 105f is disposed so that the center thereof is positioned at the intersection of the x and y axes, and the pitch of the diffraction lattice 105f is disposed along the y-axis. As shown by the expanded view C, the second diffraction lattice 105g formed on the returning light reflecting surface 105d" is rectangular having a size of 0.8 mm (min)×0.84 mm (min), the pitch thereof being disposed along the y-axis. The three-beam diffraction lattice 105h formed on the incidence surface 105a is rectangular having a size of 0.8 mm (min)× 0.64 mm (min), the pitch thereof being disposed along the x-axis.

As shown by the side view B, the three-beam diffraction lattice 105h is formed in a manner such that a line along the lattice formation direction (perpendicular to the direction of the pitch) of the three-beam diffraction lattice 105h is tilted counterclockwise by an angle of 1.19 degrees so that the split three beams are applied to a most appropriate position on the data recording surface of the optical disk. Each of the second diffraction lattice 105g and the three-beam diffraction lattice 105h is disposed in a manner such that the side thereof having the length of 8 mm is disposed along the x-axis, the center of the side being at the intersection of the x and y axes.

The first diffraction lattice 105f, the second diffraction lattice 105g, and the three-beam diffraction lattice 105h are described in detail with reference to FIGS. 8 to 10.

Figure 8:
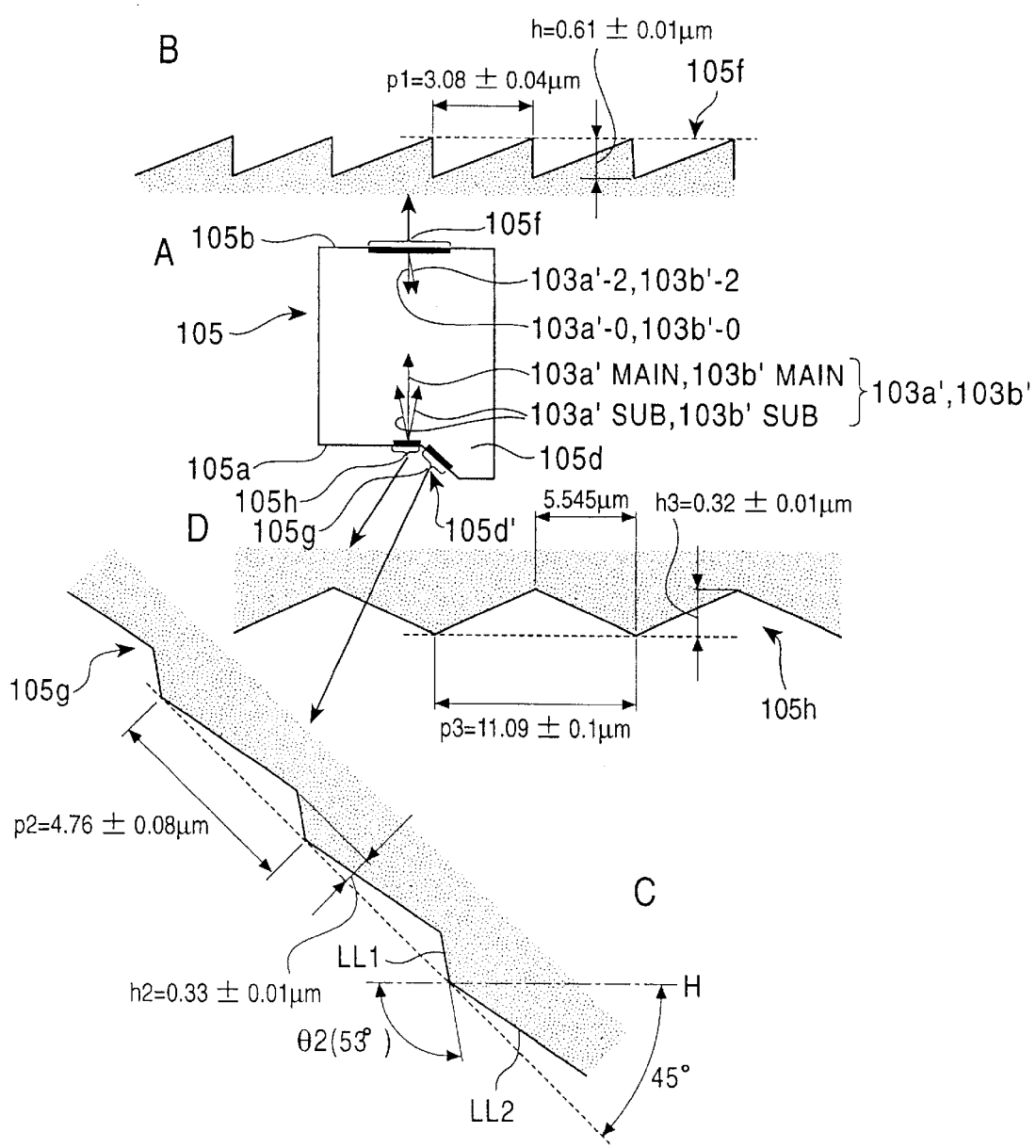
FIG. 8 includes a plan view A of the compound optical unit, an expanded view B of a first diffraction lattice, an expanded view C of the second diffraction lattice, and an expanded view D of the three-beam diffraction lattice, which are used in the optical pickup apparatus according to the second embodiment of the present invention.
Figure 9:
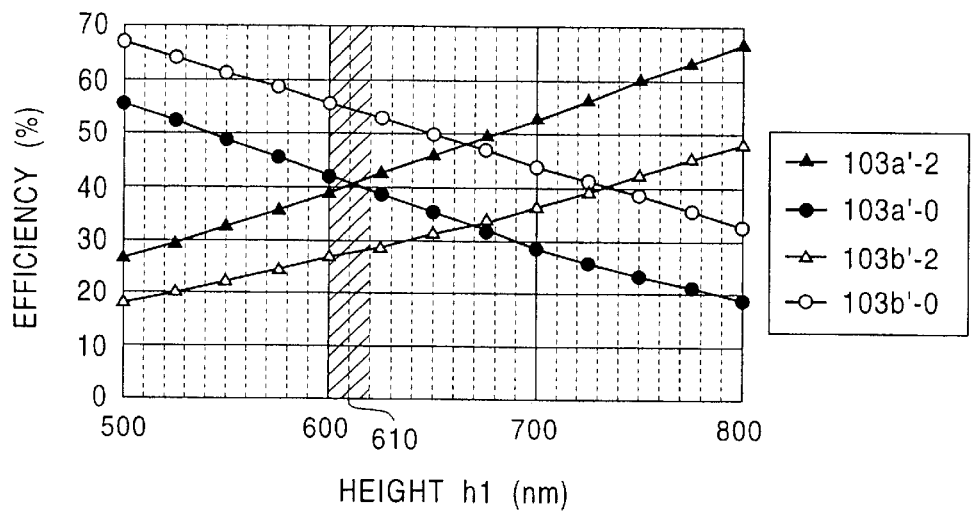
FIG. 9 is a graph showing the divergence efficiency in the first diffraction lattice used in the optical pickup apparatus according to the second embodiment of the present invention.

A plan view A in FIG. 8 shows the compound optical device 105. An expanded view B in FIG. 8 shows the first diffraction lattice 105f. An expanded view C in FIG. 8 shows the second diffraction lattice 105g. An expanded view D shows the three-beam diffraction lattice 105h. FIG. 9 is a graph showing the divergence efficiency of the first diffraction lattice 105f. FIG. 10 is a graph showing the divergence efficiency of the three-beam diffraction lattice 105h. FIG. 11 is an illustration of the compound optical unit 101.

As shown by the expanded view B in FIG. 8, the first diffraction lattice 105f has a saw-toothed shape (blaze-type). The pitch p1 of teeth is set to 3.08 μm, and the height h1 of each tooth is set to 0.61 µm (center value). FIG. 9 is a graph showing the divergence efficiency of the first diffraction lattice 105f, that is, the ratio of the returning light beams 103a'-2 (103b'-2), which are first-order diffracted laser beams diffracted by the first diffraction lattice 105f, to the laser beams 103a' (103b') (see FIG. 3) emitted by the emission surface 105b shown by the plan view A in FIG. 8 is shown in percentage. 0th-order laser beams from the first diffraction lattice (laser beams transmitted without being diffracted by the first diffraction lattice 105f) are represented by 103'-0 (103b'-0) shown by the plan view A in FIG. 8, which are laser beams not used for forming read signals or focusing and tracking control signals. In FIG. 9, when the height h1 of the first diffraction lattice 105f is 610 nm (=0.61 µm) (center value), the efficiency of the returning light beams 103a'-2 from the DVD 62 is approximately 40%, and the efficiency of the returning light beams 103b'-2 from the CD 61 is approximately 28%, the obtained values of the efficiency being sufficient for forming read signals and focusing and tracking signals.

As shown by the expanded view C in FIG. 8, the second diffraction lattice 105g has a modified blaze-type saw-toothed shape. The pitch p2 of the teeth is set to 4.76 µm, and the height h2 of each tooth is set to 0.33 µm. Each tooth has flanks LL1 and LL2 having a different length from each other. The flank LL1 has an angle θ2 of 53 degrees with respect to a line H which is parallel to the incidence surface 105a.

As shown by the expanded view D in FIG. 8, the three-beam diffraction lattice 105h has isosceles-triangular teeth. The pitch p3 of the teeth is set to 11.09 µm, and the height h3 of each tooth is set to 0.32 µm. The three-beam diffraction lattice 105h forms three beams by splitting the laser beams 103a' (103b') emitted by the light source 103a (103b) (see FIG. 5) into a main beam 103a' MAIN (103b' MAIN) which is a 0th-order light beam and two sub-beams 103a' SUB (103b' SUB) which are first-order light beams.

Figure 10:
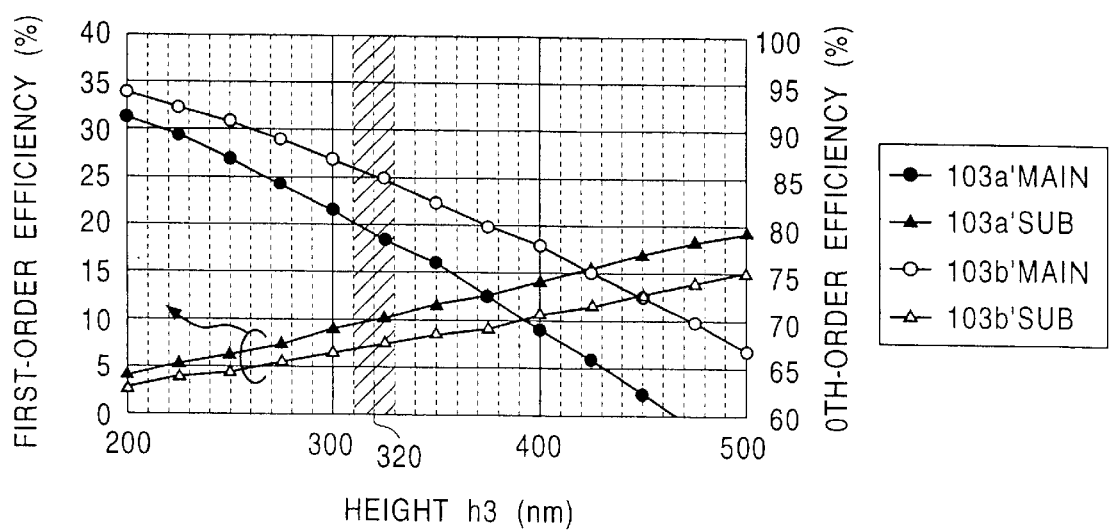
FIG. 10 is a graph showing the divergence efficiency in the three-beam diffraction lattice used in the optical pickup apparatus according to the second embodiment of the present invention.
Figure 11:
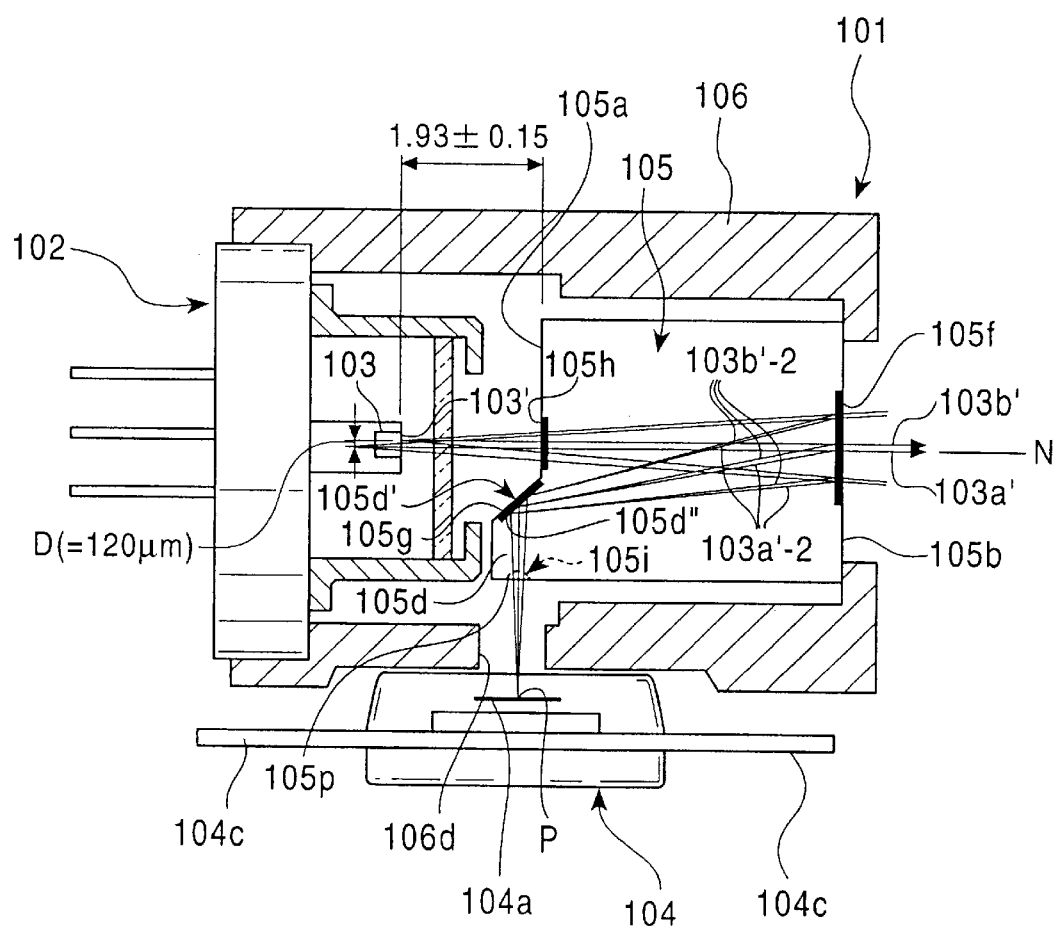
FIG. 11 is an illustration of a compound optical unit used in the optical pickup apparatus according to the second embodiment of the present invention.

FIG. 10 is a graph showing the divergence efficiency of the three-beam diffraction lattice 105h. The ratio of the main beam 103a' MAIN (103b' MAIN) to the laser beams 103a' (103b') and the ratio of the sub-beams 103a' SUB (103b' SUB) to the laser beams 103a' (103b') are shown as a 0th-order efficiency (%) and a first-order efficiency (%), respectively. In FIG. 10, when the height h3 of the three-beam diffraction lattice 105h is set to 320 nm (=0.32 µm) (center value), the 0th-order efficiency of the main beam 103a' MAIN for the DVD 62 is approximately 78%, and the first-order efficiency of the sub-beams 103a' SUB for the DVD 62 is approximately 10%. The 0th-order efficiency of the main beam 103b' MAIN for the CD 61 is approximately 85%, and the first-order efficiency of the sub-beams 103b' SUB for the CD 61 is approximately 7.2%. The obtained values of the efficiency are sufficient for forming read signals and focusing and tracking signals.

As shown in FIG. 11, in the compound optical device 105, the end face 103' of the laser chip 103 contained in the two-wavelength laser diode 102 and the incidence surface 105a are disposed and fixed to the housing 106, in parallel to each other at the distance of 1.93 mm from each other. The compound optical device 105 is disposed so that the central line N thereof coincides with the optical axis of the laser beams 103a' emitted by the light source 103a (see FIG. 4).

The function of the compound optical device 105 is described below.

As shown in FIG. 11, the returning light beams of the laser beams 103a' (103b') from the DVD 62 (CD 61) are diffracted by the first diffraction lattice 105f formed on the emission surface 105b and converted into the returning light beams 103a'-2 (103b'-2). Since the returning light beaves 103b'-2 from the CD 61 have a longer wavelength than that of the returning light beams 103a'-2 from the DVD 62, the diffraction angle of the returning light beams 103b'-2 is greater than that of the returning light beams 103a'-2, as shown in FIG. 11 (diffraction lattices employ a principle that laser beams having a longer wavelength have a greater diffraction angle). By using this difference in diffraction angle, the returning light beams 103a'-2 and 103b'-2 are applied to one position of incidence on the returning light reflecting surface 105d", the optical axes of the returning light beams 103a'-2 and 103b'-2 having had a distance D therebetween before being diffracted, which were the laser beams 103a' and 103b'.

Now, when the returning light beams 103a'-2 and 103b'-2 are simply reflected by the returning light reflecting surface 105d" of the compound optical device 105, the returning light beams 103a'-2 and 103b'-2 cannot be applied to the light receiving pattern P of the light receiving element 104a because the angles of incidence of the two light beams to the returning light reflecting surface 105d" are different from each other. In order to correct for this difference in incidence angle, the second diffraction lattice 105g is provided on the returning light reflecting surface 105d'. That is, the returning light beams 103a'-2 and 103b'-2 incident on the second diffraction lattice 105g, and to be reflected by the returning light reflecting surface 105d", are diffracted by the second diffraction lattice 105g so that the optical axes thereof coincide.

Thus, the returning light beams 103a'-2 and 103b'-2 diffracted by the first diffraction lattice 105f are corrected so as to be received on the same light receiving pattern P on the light receiving element 104a, whereby the two laser beams generated by the light sources 103a and 103b having two different wavelengths can be received by the light receiving device 104 having only one light receiving element which is the light receiving element 104a.

A method for forming focusing and tracking control signals by the light receiving element 104a of the light receiving device 104 is described below.

Figure 12:
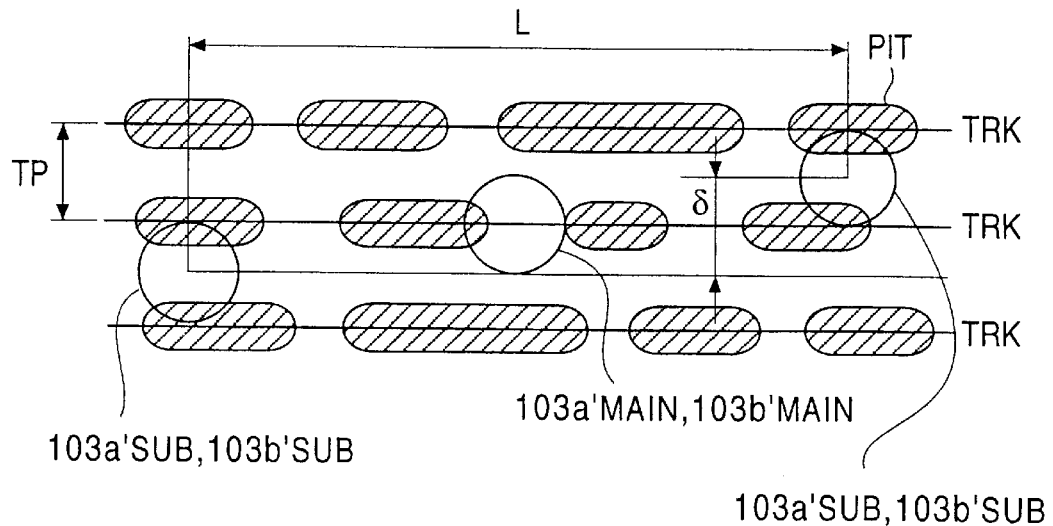
FIG. 12 a schematic view of a laser beam split into three beams, and focused on the data recording surface of an optical disk, the laser beams being emitted and received by the optical pickup apparatus according to the second embodiment of the present invention.

FIG. 12 is a schematic view in which the laser beams 103a' (103b') split into three beams are condensed and applied to a data recording surface of an optical disk.

In FIG. 12, the laser beams 103a' (103b'), split into three beams by the three-beam diffraction lattice 105h formed on the incidence surface 105a of the compound optical device 105 (see FIG. 8), are condensed and applied to the data recording surface of an optical disk, that is, the DVD 62 (CD 61).

Tracks TRK are formed on a data recording surface (surface on which data is recorded in the case of a write-type optical disk). A gap between the tracks TRK, which is a track pitch TPTR, is set to a predetermined value. Elliptic grooves (or the equivalent) having a predetermined length, which are called pits PIT, are formed in series on each track TRK. The main beam 103a' MAIN (103b' MAIN), which is a 0the-order light beam from the laser beams 103a' (103b'), scans the tracks TRK, and reads the data of the rows of the pits PIT, thereby reading from the optical disk.

The two sub-beams 103a' SUB (103b' SUB), which are first-order light beams from the laser beams 103a' (103b'), are disposed across the main beam 103a' MAIN (103b' MAIN) therebetween at a distance L and a distance δ in a direction along the track TRK and in a direction perpendicular to the track TRK, respectively, between each sub-beam 103a' SUB (103b' SUB), the sub-beams 103a' SUB (103b' SUB) being used for tracking control which is described below. In a write-type optical disk (CD-R, DVD-RAM, or the like), grooves for recording the pits PIT are formed in advance on a part of the optical disk or on the entire surface, in which the pits PIT are formed. The grooves with the pits PIT written therein are the same as the tracks TRK on read-only CDs and DVDs. When writing, tracking control is performed by using the grooves.

With reference to FIGS. 13 to 17, focusing and tracking control methods, which are servo control systems, are described below, and which are used for optical disks such as a CD, DVD, and DVD-RAM, according to the present embodiment.

Figure 13:
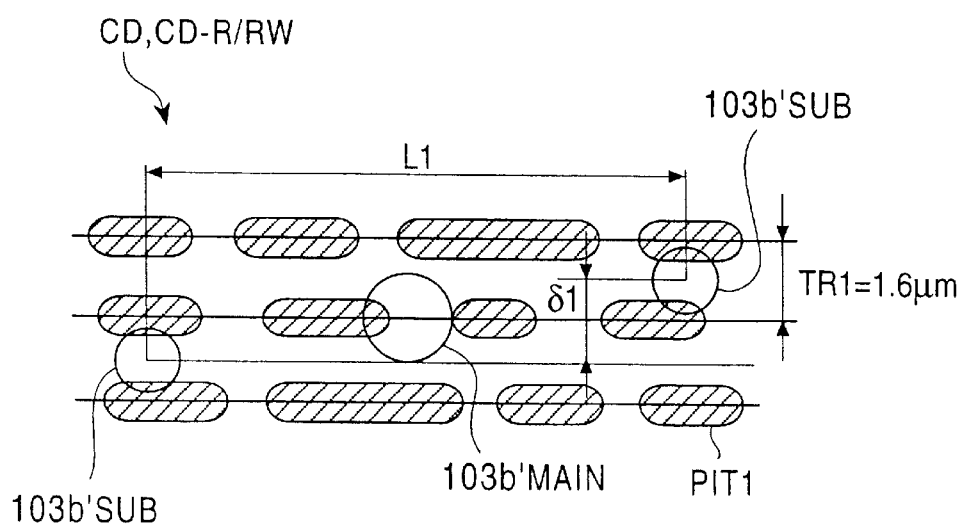
FIG. 13 is an expanded view of rows of pits PIT1 formed on a CD used in the optical pickup apparatus according to the embodiments of the present invention.
Figure 14:
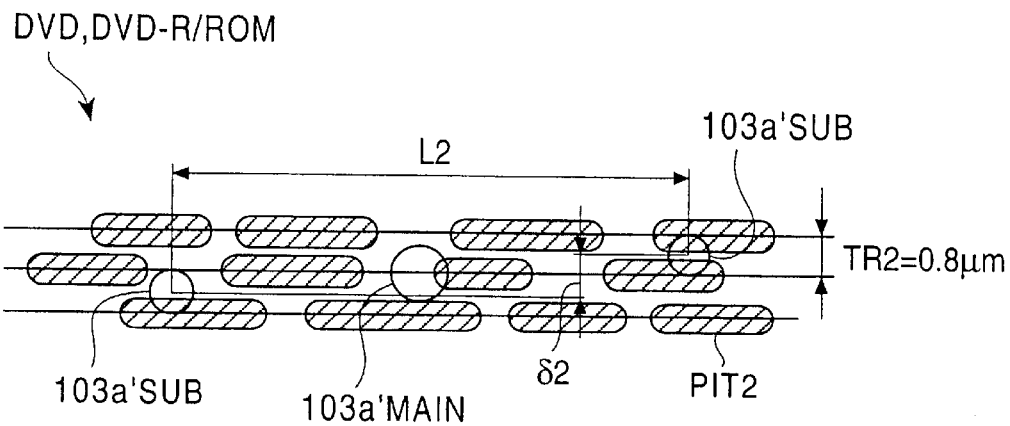
FIG. 14 is an expanded view of rows of pits PIT2 formed on a DVD used in the optical pickup apparatus according to the embodiments of the present invention.
Figure 15:
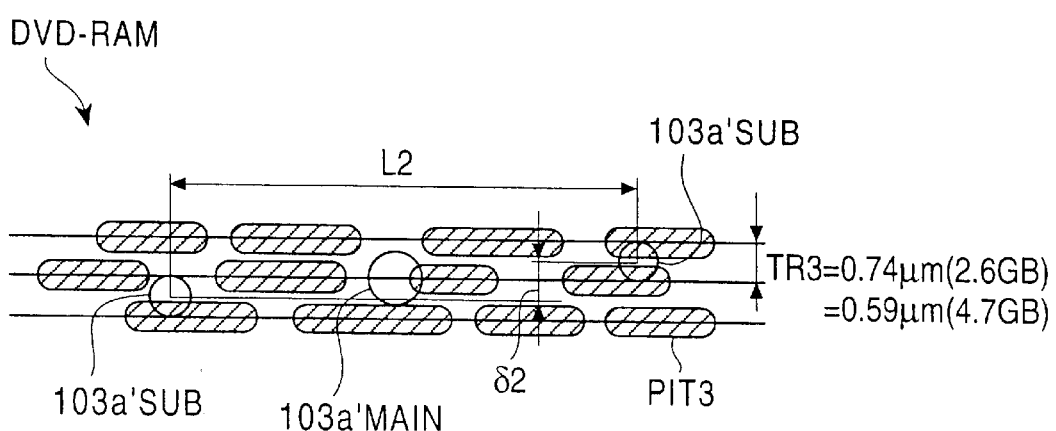
FIG. 15 is an expanded view of rows of pits PIT3 formed on a DVD-RAM (memory size of 2.6 GB or 4.7 GB) used in the optical pickup apparatus according to the embodiments of the present invention.
Figure 16:
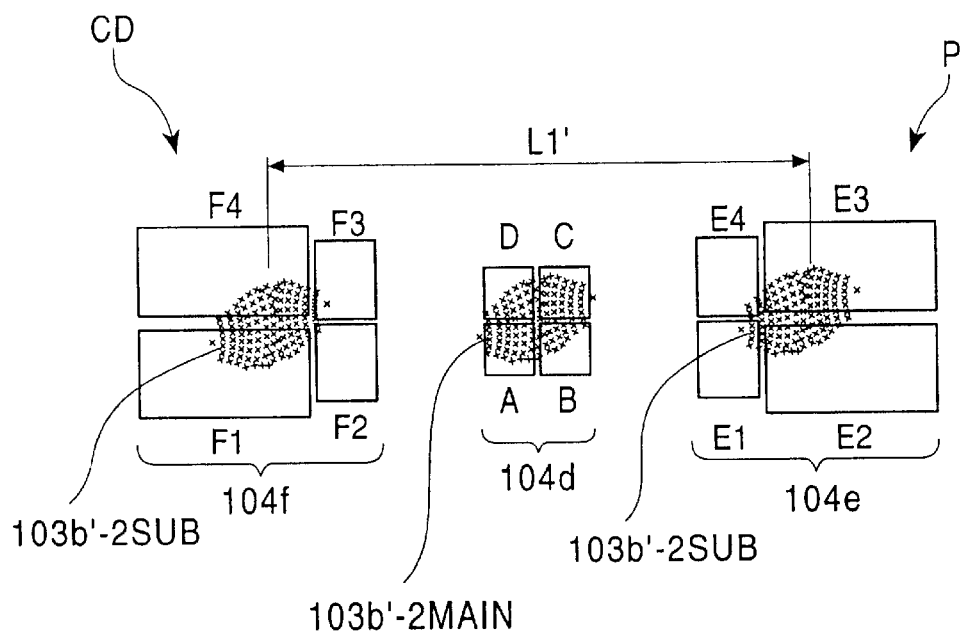
FIG. 16 is an illustration showing focusing and tracking control on a CD used in the optical pickup apparatus according to the embodiments of the present invention.
Figure 17:
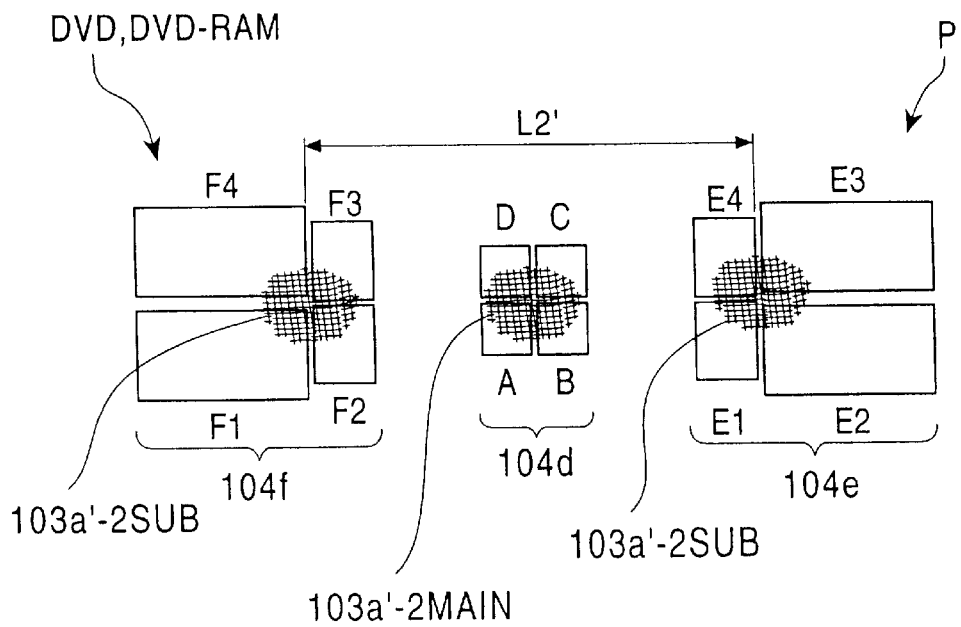
FIG. 17 is an illustration showing focusing and tracking control on a DVD and a DVD-RAM used in the optical pickup apparatus according to the embodiments of the present invention.

FIG. 13 is an expanded view of a part of rows of pits PIT1 formed on a CD. FIG. 14 is an expanded view of a part of rows of pits PIT2 formed on a DVD. FIG. 15 is an expanded view of a part of rows of pits PIT3 formed on a DVD-RAM (memory-size of 2.6 GB or 4.7 GB). FIG. 16 is an illustration showing focusing and tracking control on a CD. FIG. 17 is an illustration showing focusing and tracking control on a DVD or DVD-RAM.

An astigmatism method and a three-beam method are used for focusing control and tracking control, respectively, on a CD (including CD-R and CD-RW). As shown in FIG. 13, a track pitch TR1 is set to 1.6 μm (center value) according to the standards for a CD. A distance δ1 between the two sub-beams 103b' SUB of the laser beams 103b' for a CD is set to ½ of the value of the track pitch TR1, which is a most preferable value in the tracking control by a three-beam method, that is, 0.8 μm.

FIG. 16 shows a state in which the light receiving pattern P of the light receiving element 104a receives a main beam 103b'-2MAIN and two sub-beams 103b'-2SUB of the returning light beams 103b'-2, which correspond to the main beam 103b' MAIN and the two sub-beams 103b' SUB which are split beams of the laser beams 103b' applied to a CD.

When the condensed main beam 103b' MAIN is just focused on the CD 61, the main beam 103b'-2MAIN is applied to the photodiode 104d and received by the four photodiodes A, B, C, and D of the photodiode 104d in an even light intensity on each of the photodiodes A, B, C, and D, because the main beam 103b'-2MAIN has been transmitted by the cylindrical surface 105i (see FIG. 11) for an astigmatism method. When the main beam 103b' MAIN is out of the just focusing position backward or forward on the CD 61, the light density of the main beam 103b'-2MAIN is applied to the photodiode 104d by being biased toward the photodiodes A and C or B and D, in which focusing control is performed so as to make the light intensity even for each of the photodiodes A, B, C, and D. Therefore, a focusing control signal FE1 is obtained from the expression FE1= (VA+VC)−(VB+VD) (VA, VB, VC, and VD denote output voltages photoelectrically converted by each photodiode A, B, C, or D). A read signal is obtained from the sum of the output voltages of the photodiodes A, B, C, and D, that is, from VA+VB+VC+VD. The operation in the case of DVDs or DVDs-RAM is performed in the same way as in the case of CDs, CDs-R, and CDs-RW; therefore, the description for the former is omitted.

The distance L1 between the two sub-beams 103b'-2SUB is designed so that the two sub-beams 103b'-2SUB are received by the photodiodes E2 and E3 and the photodiodes F1 and F4 of the photodiode 104e and the photodiode 104f, respectively. The tracking control is performed so that the light density applied to the photodiodes E2 and E3 and the light density applied to the photodiodes F1 and F4 are the same. Therefore, a tracking control signal TE1 is obtained from the expression TE1=(VF1+VF4)−(VE2+VE3) (VF1, VF4, VE2, and VE3 denote the output voltages photoelectrically converted by the photodiodes F1, F4, E2, and E3, respectively).

In the case of a DVD (including DVD-R, DVD-RW, DVD-ROM and the like), an astigmatism method and DPD (differential phase detection) method are used for focusing control and tracking control, respectively. As shown in FIG. 14, a track pitch TR2 is set to 0.8 μm (center value) according to the standards for DVD. A distance δ2 between the two sub-beams 103a' SUB of the laser beams 103a' for a DVD is set to a value in accordance with the wavelength. Since the distance δ1 between the two sub-beams 103b' SUB for a CD is set to 0.8 μm, the distance δ2 is set to 0.67 μm which is obtained from the expression δ2=(650 nm/780 nm)×δ1. The distance L2 between the two sub-beams 103a' SUB in a direction along the track is obtained by the expression L2=(650 nm/780 nm)×L1, which is smaller than the distance L1.

FIG. 17 shows a state in which the light receiving pattern P of the light receiving element 104a receives a main beam 103a'-2MAIN and two sub-beams 103a'-2SUB of the returning light beams 103a'-2, which correspond to the main beam 103a' MAIN and the two sub-beams 103a' SUB which are split beams of the laser beams 103a' applied to a DVD.

The main beam 103a'-2MAIN is transmitted by the cylindrical surface 105i for an astigmatism method, whereby a focusing control signal FE2 can be obtained from the expression FE2=(VA+VC)−(VB+VD) in the same manner as in the case of a CD.

The distance L2 ((650 nm/780 nm)×L1) between the two sub-beams 103a'-2SUB is designed so that the two sub-beams 103a'-2SUB are received by the photodiodes E1 to E4 and the photodiodes F1 to F4 of the photodiode 104e and the photodiode 104f, respectively. However, the tracking control in the case of a DVD uses an output signal from the photodiode 104d rather than the output signal from the photodiodes 104e and 104f. The tracking control signal is obtained from the expression TE2=PHASE((AV+VC)− (VB+VD)). That is, the tracking control signal is formed by the phase contrast between (VA+VC) and (VB+VD).

In the case of a DVD-RAM, an astigmatism method and a DPP (differential push-pull) method are used for focusing control and tracking control, respectively. According to the standards for DVD-RAM, disks having a memory size of 2.6 GB and 4.7 GB (memory on one surface) are standardized. As shown in FIG. 15, a disk having a capacity of 2.6 GB has a track pitch TR3 of 0.74 μm, and the track pitch TR3 of a disk having a capacity of 4.7 GB is set to 0.59 μm. In a DPP method for tracking control, the distance δ2 between the two sub-beams 103a' SUB is most preferably set to the same value as of the track pitch TR3. According to the present embodiment, the distance δ2 is set to 0.67 μm which equals the mean value of the track pitch of the disks having 2.6 GB and 4.7 GB, of 0.74 μm and 0.59 μm, respectively. Therefore, tracking control by a DPP method is possible on a DVD-RAM having a memory size of 2.6 GB and a DVD-RAM having a memory size of 4.7 GB, according to the embodiment of the present invention.

FIG. 17 shows a state in which the light receiving pattern P of the light receiving element 104a receives a main beam 103a'-2MAIN and two sub-beams 103a'-2SUB of the returning light beams 103a'-2, which correspond to the main beam 103a' MAIN and the two sub-beams 103a' SUB which are split beams of the laser beams 103a' applied to a DVD-RAM (in the same fashion as in the case of a DVD).

The main beam 103a'-2MAIN is transmitted by the cylindrical surface 105i for an astigmatism method, whereby a focusing control signal FE3 can be obtained from the expression FE3=(VA+VC)−(VB+VD) in the same manner as in the case of a DVD.

The distance L2 ((650 nm/780 nm)×L1) between the two sub-beams 103a'-2SUB is designed so that the two sub-beams 103a'-2SUB are received by the photodiodes E1 to E4 and the photodiodes F1 to F4 of the photodiode 104e and the photodiode 104f, respectively. Tracking control by a DPP method uses an output signal from the photodiodes 104e and 104f. A tracking control signal TE3 is obtained from the expression TE3=(VA+VD)+(VB+VC)−k1((VEF1+VEF4)−(VEF2+VEF3)) (VEF1, VEF2, VEF3, and VEF4 denote the sums of voltages outputted by the photodiodes E1 and F1, E2 and F2, E3 and F3, and E4 and F4, respectively, and k1 denotes a predetermined coefficient).

As described above, by using the light receiving device 104 having one light receiving element 104a, a read signal and focusing and tracking control signals can be produced from the laser beams reflected by any of the CD, DVD, and DVD-RAM.

As shown in FIGS. 3 and 4, according to the present embodiment, the optical pickup apparatus 100 includes the compound optical unit 101 including the housing 106 provided therein with the compound optical, device 105, the light generating device 102 for emitting the laser beams 103a' (wavelength in the 650 nm band) for a DVD and the laser beams 103b' (wavelength in the 780 nm band) for a CD in parallel to each other, and the light receiving device 104 having the light receiving element 104a for receiving the returning light beams 103a'-2 and 103b'-2, which are fixed to the housing 106. The optical pickup apparatus 100 also includes the carriage 500 provided with the objective lens 200, the reflective mirror 300, and the collimator lens 400. The optical axes of the returning light beams 103a'-2 and 103b'-2 coincide with each other through the compound optical device 105, and the returning light beams 103a'-2 and 103b'-2 can be emitted from the returning light emitting surface 105p toward the light receiving device 104, whereby the returning light beams 103a'-2 and 103b'-2 can be received by one light receiving element which is the light receiving element 104a. A light receiving device having one light receiving element generally used in the field can be used as the light receiving device 104. Therefore, although the optical pickup apparatus 100 according to the invention is an optical system which uses laser beams having two wavelengths, it can be simplified as in an optical system using laser beams having one wavelength exclusively for CDs. Moreover, the cost of the light receiving device 104 can be reduced because a conventional light receiving device can be used, thereby reducing costs of the optical pickup apparatus 100.

The compound optical unit 101 includes the light generating device 102, the light receiving device 104, and the compound optical device 105 mounted in the housing 106 and fixed thereto as a unit, whereby the position of the compound optical unit 101 in an optical system can be adjusted as a unit. Therefore, the relationship of positions between the light emitting position of the light generating device 102 and the light receiving position of the light receiving device 104 does not change when adjusting the position of the compound optical unit 101, whereby a broad range of options for the position adjustment of the compound optical unit 101 can be ensured, and precise adjustment is not required, thereby making position adjustment processes simple.

The light generating device 102 is contained in a package, as shown in FIG. 5, thereby reducing costs of the light generating device 102 which can be manufactured on a large scale as a discrete part, in which the laser chip 103 including the light sources 103a and 103b are manufactured on a substrate at a predetermined position in a process similar to a semiconductor manufacturing process, thereby reducing costs of the optical pickup apparatus 100.

The compound optical device 105 is manufactured by molding a resin integrally with the first and second diffraction lattices 105f and 105g and the three-beam diffraction lattice 105h on the emission surface 105b, the returning light reflecting surface 105d", and the incidence surface 105a, respectively, whereby it is not necessary to prepare diffraction lattices independently, and costs of the compound optical device 105 can be reduced. The material of the compound optical device 105, which is a resin, can be obtained at a cost lower than glass, and makes the configuration easier.

A three-beam method and a DPP method, which are preferable tracking control methods for the CD 61 and the DVD 62, respectively, are used, and the light receiving device 104 produces tracking control signals for these methods, whereby a reliable optical pickup apparatus can be realized.

The compound optical device and the compound optical unit according to the present invention can be used in an optical apparatus having a plurality of light sources for generating light beams of different wavelengths.

According to the present invention, a housing to be mounted on an optical apparatus includes a light generating device, a light receiving device, and a compound optical device mounted and fixed to the housing. The light generating device includes a plurality of light generating elements for emitting light beams of different wavelengths. The compound optical device includes an incidence surface to which the light beams emitted by the light generating device are applied and an emission surface which emits the light beams applied to the incidence surface, a diffraction element disposed on the emission surface for diffracting a returning light beams from the optical apparatus, a reflective surface for reflecting the light beams diffracted by the diffraction element, and a correction element disposed on the reflective surface for focusing the light beams of different wavelengths on one position on the light receiving device. With this arrangement, one compound optical unit can operate for an optical apparatus which uses light beams having a plurality of wavelengths, in which only one light receiving device is required due to the correction element. Position adjustment is required only for the light receiving device, thereby suppressing costs of adjustment processes.

The light generating device is configured with a first package including the light generating elements and external terminals provided on the first package. The light receiving device is configured with a second package including a light receiving element and external terminals provided on the second package. The light generating device and the light receiving device, using discrete parts manufactured independently at low cost, form the compound optical unit according to the present invention, whereby handling of each component is easy, thereby facilitating the assembly in the housing and reducing the costs of materials and manufacturing processes.

A diffraction lattice is used as the correction element. The correction element can be prepared with a typical and simple optical element, thereby simplifying the structure.

The diffraction lattice is a rugged part integral with the reflective surface, which can be formed integrally with the compound optical device. It is not necessary to prepare the diffraction lattice independently, thereby reducing costs of the compound optical device.

The incidence surface and the emission surface are disposed substantially in parallel to each other, the light generating device is disposed in the housing so that the optical axes of the emitted light beams from the light generating elements are disposed substantially perpendicular to the emission surface, the reflective surface is inclined with respect to the emission surface, and the light receiving device is disposed substantially at an angle of 90 degrees. With this arrangement, the light generating device and the light receiving device are disposed compactly in the housing rather than occupying a large space by disposing the light generating device and the light receiving device parallel to each other in the housing, whereby the optical unit can be made in a practical size.

The compound optical device provided with the diffraction element and the correction element is made integrally with the diffraction element and the correction element by molding a resin. Therefore, the material can be obtained at low cost and the configuration is easy, compared with the case of a compound optical device made of glass. Moreover, the time required for formation can be reduced because the diffraction element and the correction element are formed integrally with the compound optical device, thereby reducing costs of the compound optical device.

The optical apparatus is an optical pickup apparatus which is provided with an objective lens and reads from and writes on an optical disk, in which the light beams emitted by the light generating device are applied to the optical disk through the objective lens, and returning light beams from the optical disk are received by the light receiving device. The devices and units according to the present invention can be used in an optical pickup apparatus.

According to the present invention, a compound optical device includes an incidence surface to which laser beams of different wavelengths and optical axes parallel to each other are applied, an emission surface for emitting the laser beams applied to the incidence surface, a returning light incoming surface to which returning light beams of the laser beams emitted by the emission surface are applied, a returning light emitting surface for emitting the returning light beams applied to the returning light incoming surface, and a returning light reflecting surface for reflecting the returning light beams incident on the returning light incoming surface toward the returning light emitting surface. A first diffraction element is provided on the returning light incoming surface for diffracting the returning lights toward one position on the returning light reflecting surface, and a second diffraction element is provided on the returning light reflecting surface for correcting for the difference in incidence angles of the returning light beams applied to the returning light reflecting surface with respect to the returning light reflecting surface and for leading the reflected returning light beams along the same optical axis toward the returning light emitting surface. Because the returning light emitting surface can emit the returning light beams along the same optical axis, when the compound optical device according to the present invention is used in an optical system of an optical apparatus having a plurality of light sources, the laser beams can be emitted along the same optical axis by the returning light emitting surface of the compound optical device, whereby the returning light beams can be received by one light receiving element. A light receiving device having one light receiving element generally used in the field is used as the light receiving device. Therefore, although an optical system may use laser beams having two wavelengths, it can be simplified as in an optical system using laser beams having one wavelength. Moreover, the cost of the light receiving device can be reduced because a conventional light receiving element can be used. Adjustment processes can be simplified because only position adjustment of the light receiving device is necessary.

In the compound optical unit according to the present invention, components are assembled in the housing as a unit in a manner such that the light generating device, the light receiving device, and the compound optical device are mounted in and are fixed to the housing. The light generating device includes a plurality of light sources for emitting laser beams. The light receiving device includes a light receiving element for receiving returning light beams emitted by the returning light emitting surface. The housing is provided therein with an opening for emitting the laser beams emitted by the emission surface and receiving the returning light beams therethrough. By the components assembled as a unit, when the compound optical unit according to the present invention is used in an optical system of an optical apparatus using a plurality of light sources, the optical system can be configured easily by using, as a major component, the compound optical unit arranged in a module. The position of the compound optical unit in an optical system can be adjusted as a unit. Therefore, the relationship of positions between the light emitting position of the light generating device and the light receiving position of the light receiving device does not change when adjusting the position of the compound optical unit, whereby a broad range of options for the position adjustment of the compound optical unit can be ensured, and precise adjustment is not required, thereby making position adjustment processes simple.

The light generating device is contained in a package, thereby reducing costs of the light generating device which can be manufactured on a large scale as a discrete part, in which the light sources are manufactured on a substrate at a predetermined position in a process similar to a semiconductor manufacturing process, thereby reducing costs of the compound optical unit.

The first and second diffraction elements are diffraction lattices having rugged parts formed integrally with the returning light incoming surface and the returning light reflecting. surface, respectively. It is not necessary to prepare the diffraction lattices independently, because the diffraction lattices can be formed integrally with the compound optical device, thereby reducing costs of the compound optical unit.

The compound optical unit provided with two light sources for emitting laser beams having wavelengths in the 780 nm band and the 650 nm band can be used in an optical pickup apparatus for a DVD in which laser beams having two wavelengths are required for reading from and writing on a DVD and CD. Therefore, a low-cost optical pickup apparatus can be realized.

By the three-beam diffraction lattice provided on the incidence surface, the laser beam is split into three beams and emitted by the emission surface, the returning three beams from the optical disk are received by the light receiving element, and tracking control by a three-beam method for the laser beams having a wavelength in the 780 nm band, and tracking control by a DPP (differential push-pull) method and a DPD (differential phase detection) method for the laser beams having a wavelength in the 650 nm band can be performed. With this arrangement, although one light receiving element of the light receiving device receives a plurality of the returning light beams, tracking control methods most preferable for a CD (CD-R) using laser beams in the 780 nm band and for a DVD using laser beams in the 650 nm band, which are a three-beam method and a DPP method, respectively, can be used, whereby a reliable optical pickup apparatus is made possible.

The compound optical device is manufactured by molding a resin integrally with the first and second diffraction elements. Therefore, the compound optical device can be manufactured at a low cost and be easily formed, compared with if it were made of glass. The time required for molding can be reduced because the first and second diffraction elements and the three-beam diffraction element are formed integrally with the compound optical device by molding, thereby reducing costs of the compound optical device and thereby reducing costs of the optical unit.

According to the present invention, the optical pickup apparatus is provided with the compound optical device, the light generating device having a plurality of light sources for emitting laser beams of different wavelengths, of which the optical axes are disposed in parallel to each other at a predetermined distance from each other, and the objective lens for condensing the laser beams emitted by the emission surface so as to focus the laser beams on an optical disk. With this arrangement, the returning light beams can be emitted along the same optical axis through the compound optical device in an optical system of the optical pickup apparatus having the plurality of light sources, whereby the returning light beams can be received by one light receiving element, thereby enabling the optical pickup apparatus to use the light receiving device having one light receiving element which is widely used in the field as a light receiving device. Therefore, an optical pickup apparatus, which includes an optical system having a simplified structure such as that of an optical system having one wavelength exclusively for a CD, is made possible. Moreover, the cost of the light receiving device can be reduced because a conventional light receiving element can be used. Adjustment processes can be simplified because only position adjustment of the light receiving device is necessary.

The optical pickup apparatus is provided with the compound optical unit configured with the components assembled as a unit and the objective lens for condensing the laser beams emitted by the emission surface onto the optical disk. Therefore, an optical system having a plurality of light sources can be configured with only the compound optical unit and the objective lens as major components, whereby an optical pickup apparatus having a simple structure is made possible. The position of the compound optical unit in an optical system can be adjusted as a unit. Therefore, the relationship of positions between the light emitting position of the light generating device and the light receiving position of the light receiving device does not change when adjusting the position of the compound optical unit, whereby a broad range of options for the position adjustment of the compound optical unit can be ensured, thereby simplifying position adjustment processes.

What is claimed is:

1. A compound optical unit comprising:
   a housing mounted on an optical apparatus;
   a light generating device fixed to the housing and including a plurality of light generating elements to emit light beams of different wavelengths;
   a light receiving device fixed to the housing; and
   a compound optical device fixed to the housing,
   the compound optical device including an incidence surface on which the light beams emitted by the light generating device are incident and an emission surface from which the light beams are emitted, a diffraction element provided on the emission surface to diffract light beams returned to the compound optical device, and a reflective surface to reflect the light beams diffracted by the diffraction element toward the light receiving device, the reflective surface including a correction element to direct the diffracted light beams of different wavelengths onto the light receiving device, the correction element containing a diffraction lattice, the incidence surface, emission surface and reflective surface being separate surfaces.

2. A compound optical unit according to claim 1, the light generating device comprising a first package containing the plurality of light generating elements, and external terminals provided on the first package, and the light receiving device comprising a light receiving element, a second package containing the light receiving element, and external terminals provided on the second package.

3. A compound optical unit according to claim 1, the diffraction lattice comprising a rugged part formed integrally with the reflective surface.

4. A compound optical unit according to claim 1, wherein the incidence surface and the emission surface are disposed substantially in parallel to each other, the light generating device is disposed in the housing such that an optical axis of the light beams emitted by the light generating device is substantially perpendicular to the emission surface, the reflective surface is inclined with respect to the emission surface, and the light receiving device is disposed substantially at an angle of 90 degrees with respect to the light generating device.

5. A compound optical unit according to claim 1, wherein the compound optical device provided with the diffraction element and the correction element comprises resin, the diffraction element and the correction element being formed by molding integrally with the compound optical device.

6. A compound optical unit according to claim 1, wherein the optical apparatus provided with an objective lens is an optical pickup to read from and write on an optical disk, the light beams emitted by the light generating device are applied to the optical disk through the objective lens, and the light beams returned from the optical disk are received by the light receiving device.

7. A compound optical device comprising:
   an incidence surface to which laser beams of different wavelengths are applied, the laser beams having optical axes parallel to each other;
   an emission surface from which the laser beams applied to the incidence surface are emitted;
   a returning light incoming surface to which returning light beams of the laser beams emitted by the emission surface are applied;
   a returning light emitting surface to emit the returning light beams applied to the returning light incoming surface; and
   a returning light reflecting surface to reflect the returning light beams applied to the returning light incoming surface toward the returning light emitting surface,
   the returning light incoming surface including a first diffraction element to diffract and direct the returning light beams to a position on the returning light reflecting surface, and the returning light reflecting surface including a second diffraction element to correct for a difference of incidence angle, with respect to the returning light reflecting surface, between the returning light beams and direct the returning light beams toward the returning light emitting surface along the same optical axis, whereby the returning light emitting surface emits the returning light beams along the same optical axis.

8. A compound optical unit comprising:

the compound optical device of claim 7;

a light generating device having a plurality of light sources to emit the laser beams;

a light receiving device having a light receiving element to receive the returning light beams emitted by the returning light emitting surface; and a housing including therein the light generating device, the light receiving device, and the compound optical device, the housing including a light incoming/emitting opening through which the laser beams emitted by the emission surface are emitted and the returning light beams are received, the light generating device, the light receiving device, and the compound optical device fixed to the housing.

9. A compound optical unit according to claim 8, further comprising a package containing the light generating device.

10. A compound optical unit according to claim 8, wherein the first and second diffraction elements are diffraction lattices and include rugged parts formed integrally with the returning light incoming surface and the returning light reflecting surface, respectively.

11. A compound optical unit according to claim 8, the light generating device including two light sources to emit laser beams having wavelengths in the 780 nm band and the 650 nm band, respectively.

12. A compound optical unit according to claim 11, the incidence surface comprising a three-beam diffraction lattice to split each of the laser beams into three beams emitted by the emission surface, and returning light beams from an optical disk being received by the light receiving element, whereby a signal for tracking control by a three-beam method is outputted from the laser beams having a wavelength in the 780 nm band, and a signal for tracking control by a DPP (differential push-pull) method and a DPD (differential phase detection) method is outputted from the laser beams having a wavelength in the 650 nm band.

13. A compound optical unit according to claim 12, wherein the compound optical device having the first and second diffraction elements and the three-beam diffraction lattice is formed integrally with the first and second diffraction elements and the three-beam diffraction lattice by molding a resin.

14. An optical pickup apparatus comprising:

a compound optical unit according to claim 8; and an objective lens to condense the laser beams emitted by the emission surface onto an optical disk.

15. An optical pickup apparatus comprising:

the compound optical device according to claim 7;

a light generating device including a plurality of light sources to emit the laser beams of different wavelengths and optical axes parallel to each other at a predetermined distance from each other;

a light receiving device having the light receiving element for receiving returning light beams emitted by the returning light emitting surface; and an objective lens to condense the laser beams emitted by the emission surface onto an optical disk.

16. A method of positioning light beams of different wavelengths returning from an optical apparatus comprising:

diffracting the returning light beams on a first surface of a compound optical device;

reflecting the diffracted light beams on a second surface of the compound optical device; and correcting a trajectory of the diffracted light beams by re-diffracting the diffracted light beams to direct the light beams onto a light receiving device.

17. The method of claim 16, the correcting comprising re-diffracting the diffracted light beams along substantially the same optical axis.

18. The method of claim 17, further comprising generating the light beams prior to the light beams impinging on the optical apparatus.

19. The method of claim 18, further comprising:

splitting the generated light beams into three light beams prior to the three light beams impinging on the optical apparatus; and tracking and controlling the generated light beams.

20. The method of claim 19, the tracking and controlling comprising a three-beam method.

21. The method of claim 19, the tracking and controlling comprising a DPP (differential push-pull) method.

22. The method of claim 19, the tracking and controlling comprising a DPD (differential phase detection) method.

23. The method of claim 18, further comprising diffracting the returning light beams using a first diffraction lattice integrally formed on the first surface and re-diffracting the trajectory of the diffracted light beams using a second diffraction lattice integrally formed on the second surface.

24. The method of claim 18, further comprising condensing the generated light beams onto an optical disk.

25. The method of claim 17, further comprising diffracting the returning light beams using a diffraction lattice integrally formed on the first surface and correcting the trajectory of the diffracted light beams using a correcting mechanism integrally formed on the second surface.

* * * * *